US009353229B2

(12) United States Patent
Koslow et al.

(10) Patent No.: US 9,353,229 B2
(45) Date of Patent: May 31, 2016

(54) COMPOSITIONS INCORPORATING DIELECTRIC ADDITIVES FOR PARTICLE FORMATION, AND METHODS OF PARTICLE FORMATION USING SAME

(71) Applicants: Evan Koslow, Waterloo (CA); Jocelyn Tindale, Waterloo (CA); Ryan Gerakopoulos, Waterloo (CA); Chitral Angammana, Waterloo (CA); Tatiana Lazareva, Waterloo (CA)

(72) Inventors: Evan Koslow, Waterloo (CA); Jocelyn Tindale, Waterloo (CA); Ryan Gerakopoulos, Waterloo (CA); Chitral Angammana, Waterloo (CA); Tatiana Lazareva, Waterloo (CA)

(73) Assignee: GABAE Technologies LLC, Dallas, TX (US)

( * ) Notice: Subject to any disclaimer, the term of this patent is extended or adjusted under 35 U.S.C. 154(b) by 0 days.

(21) Appl. No.: 13/966,895

(22) Filed: Aug. 14, 2013

(65) Prior Publication Data
US 2014/0094551 A1 Apr. 3, 2014

Related U.S. Application Data

(60) Provisional application No. 61/682,894, filed on Aug. 14, 2012.

(51) Int. Cl.

| | | |
|---|---|---|
| *C08K 3/22* | (2006.01) | |
| *C08K 5/06* | (2006.01) | |
| *C08J 3/12* | (2006.01) | |
| *D01D 5/00* | (2006.01) | |
| *C08L 23/12* | (2006.01) | |
| *C03B 19/10* | (2006.01) | |
| *C03B 37/005* | (2006.01) | |
| *D01D 5/098* | (2006.01) | |
| *D01D 5/18* | (2006.01) | |
| *D01F 1/02* | (2006.01) | |
| *B05B 3/10* | (2006.01) | |
| *B05B 5/08* | (2006.01) | |
| *C08J 3/20* | (2006.01) | |
| *C08K 5/14* | (2006.01) | |
| *C08J 3/02* | (2006.01) | |
| *D01D 5/26* | (2006.01) | |
| *D01F 6/06* | (2006.01) | |
| *B05B 3/00* | (2006.01) | |
| *B05B 7/00* | (2006.01) | |

(52) U.S. Cl.
CPC ............. *C08J 3/12* (2013.01); *B05B 3/1014* (2013.01); *B05B 5/08* (2013.01); *C03B 19/1015* (2013.01); *C03B 37/005* (2013.01); *C08J 3/02* (2013.01); *C08J 3/122* (2013.01); *C08J 3/201* (2013.01); *C08K 3/22* (2013.01); *C08K 5/06* (2013.01); *C08K 5/14* (2013.01); *C08L 23/12* (2013.01); *D01D 5/0007* (2013.01); *D01D 5/0015* (2013.01); *D01D 5/0023* (2013.01); *D01D 5/0985* (2013.01); *D01D 5/18* (2013.01); *D01D 5/26* (2013.01); *D01F 1/02* (2013.01); *D01F 6/06* (2013.01); *B05B 3/001* (2013.01); *B05B 7/00* (2013.01); *C08J 2323/12* (2013.01); *C08K 2003/2241* (2013.01); *C08K 2201/001* (2013.01)

(58) Field of Classification Search
USPC .......................................... 524/432
See application file for complete search history.

(56) References Cited

U.S. PATENT DOCUMENTS

| | | | |
|---|---|---|---|
| 4,100,236 A | 7/1978 | Gordon et al. | |
| 4,554,335 A | 11/1985 | Sakagami et al. | |
| 5,300,747 A | 4/1994 | Simon | |
| 6,162,752 A | 12/2000 | Kawamoto et al. | |
| 7,498,082 B2 | 3/2009 | Ito et al. | |
| 7,901,610 B2 | 3/2011 | Joo et al. | |
| 2003/0215606 A1 | 11/2003 | Clancy et al. | |
| 2008/0242171 A1 | 10/2008 | Haung et al. | |
| 2009/0032475 A1 | 2/2009 | Ferrer et al. | |
| 2009/0130301 A1 | 5/2009 | Bahnmuller et al. | |
| 2009/0281224 A1 | 11/2009 | Koh et al. | |
| 2010/0041804 A1 | 2/2010 | Brands et al. | |
| 2010/0181707 A1 | 7/2010 | Chao et al. | |
| 2010/0202100 A1 | 8/2010 | Koh et al. | |
| 2012/0004370 A1* | 1/2012 | Scott et al. ................... 525/106 |
| 2012/0056342 A1* | 3/2012 | Koslow .......................... 264/8 |
| 2013/0085212 A1 | 4/2013 | Lagaron Cabello et al. | |
| 2014/0168857 A1* | 6/2014 | Sautter et al. ................. 361/525 |

FOREIGN PATENT DOCUMENTS

| | | |
|---|---|---|
| CN | 102031586 | 4/2011 |
| EP | 53242 | 6/1982 |
| JP | 59104911 | 6/1984 |
| JP | 04145145 | 5/1992 |
| JP | 2010229563 A | 1/2010 |
| JP | 2010121050 A | 6/2010 |
| KR | 100871440 | 12/2008 |

(Continued)

OTHER PUBLICATIONS npl_1_R. Kuzel et al "Multi-component polymeric composites", Synthetic Metals, vol. 67; pp. 255-261, 1994, p. 255, paragraph 2.

(Continued)

*Primary Examiner* — Hui Chin
(74) *Attorney, Agent, or Firm* — Bereskin & Parr LLP/S.E.N.C.R.L., s.r.l.

(57) ABSTRACT

A method of forming particles that includes performing a strong force attenuation of a mixture to form pre-particles. The mixture including a base compound and a dielectric additive having an elevated dielectric constant dispersed therein. The pre-particles are then dielectrically spun in an electrostatic field to further attenuate the pre-particles and form the particles.

18 Claims, 18 Drawing Sheets

(56) References Cited

FOREIGN PATENT DOCUMENTS

| WO | WO2006069205 A1 | 6/2006 |
|---|---|---|
| WO | WO2009127170 A2 | 10/2009 |
| WO | WO2009140381 A1 | 11/2009 |
| WO | WO2010023449 A1 | 3/2010 |
| WO | WO2010105329 A1 | 9/2010 |
| WO | WO2012013167 A2 | 2/2012 |
| WO | WO2012122485 A2 | 9/2012 |

OTHER PUBLICATIONS npl_2_Dalton_2007_electrospinning_of_polymer_melts_phenomenologi.
npl_3_Huajun_Zhou_2006_the_thermal_effects_on_electrospinning_of_polyla.
npl_4_Mel'nik_2008_Features_of_spinning_of_modified_polypropylene.
npl_5_Psarreas_2007_Nitride_mediated_controlled_degradation_of_pol.
npl_6_Rangkupan_2003_electrospinning_process_of_molten_PP_in_a_vac.
npl_7_Scorah_2009_Peroxide-controlled_degradation_of_polypropylene.
npl_8_Shin_2001_experimental_characterization_of_electrospinning.
npl_9_Warner_2006_cost_effective_nanofiber_formation_melt_electr.
npl_10_Kang_Effect_of_Dysprosium_Oxide_ElectronicMaterialsLetters_vol. 6_No. 4_Dec. 31, 2010.
npl_11_Agarwal_Determination_of_Dielectric_Electrocomponent_Science_1977_vol. 4_pp. 23-28.
npl_12—Kim_Microstructural_Evolution_of_electrically_Activated_Polymer_47_2006_5938_5945.
npl_13_Erisken_2008_a_hybrid_twin_screw_extrusion_method.
npl_14_Lee_2009_Highly_oriented_electrospun_polycaprolactone_Applied_Physics_A_2009.
npl_15_Schneider_Optimizing_mechanical_properties_of_polyproplylene_fibers.
npl_16_Polyglycerois_Product_Data_Sheet_Solvay_Chemicals_09_2008.
npl_17_Nayak_Characterisation_of_Polypropylene_PP_Nanofibres_Symposium_5_SynthesisAndChemistry.
npl_18_Lee_Stress_induced_changes_in_electrospun_Polyhmer_49_2008_4196_4203.
npl_19_Kariduraganavar_Using_an_additive_to_control_the_electrospinning_Research_Article_21_Nov. 2008.
npl20_Database_WPI_Week_201164_Thompson_Scientific_London_GB_AN_2011_M35514_XP_002724914.
npl-21_Dupont_Tedlar_Polyvinyl_Fluoride_Film_10_95.
npl_22_JP2010121050A_English_Abstract.
Database WPI Week 200935 Thomson Scientific, London, GB; AN 2009-F08014 XP002724827 & KR100871440B1, Amo Co Ltd, Dec. 3, 2008, Abstract.

\* cited by examiner

COMPOSITIONS INCORPORATING DIELECTRIC ADDITIVES FOR PARTICLE FORMATION, AND METHODS OF PARTICLE FORMATION USING SAME

RELATED APPLICATIONS

This application claims the benefit of U.S. provisional patent application Ser. No. 61/682,894, filed Aug. 14, 2012 and entitled COMPOSITIONS INCORPORATING DIELECTRIC ADDITIVES FOR PARTICLE FORMATION, AND METHODS OF PARTICLE FORMATION USING SAME, the entire contents of which are hereby incorporated by reference herein for all purposes.

FIELD

Embodiments herein relate generally to particle formation, and more particularly to compositions for particle formation that include dielectric additives, and methods of forming particles using such compositions.

BRIEF DESCRIPTION OF THE FIGURES

Embodiments will now be described, by way of example only, with reference to the following figures, in which.

Figure 1:
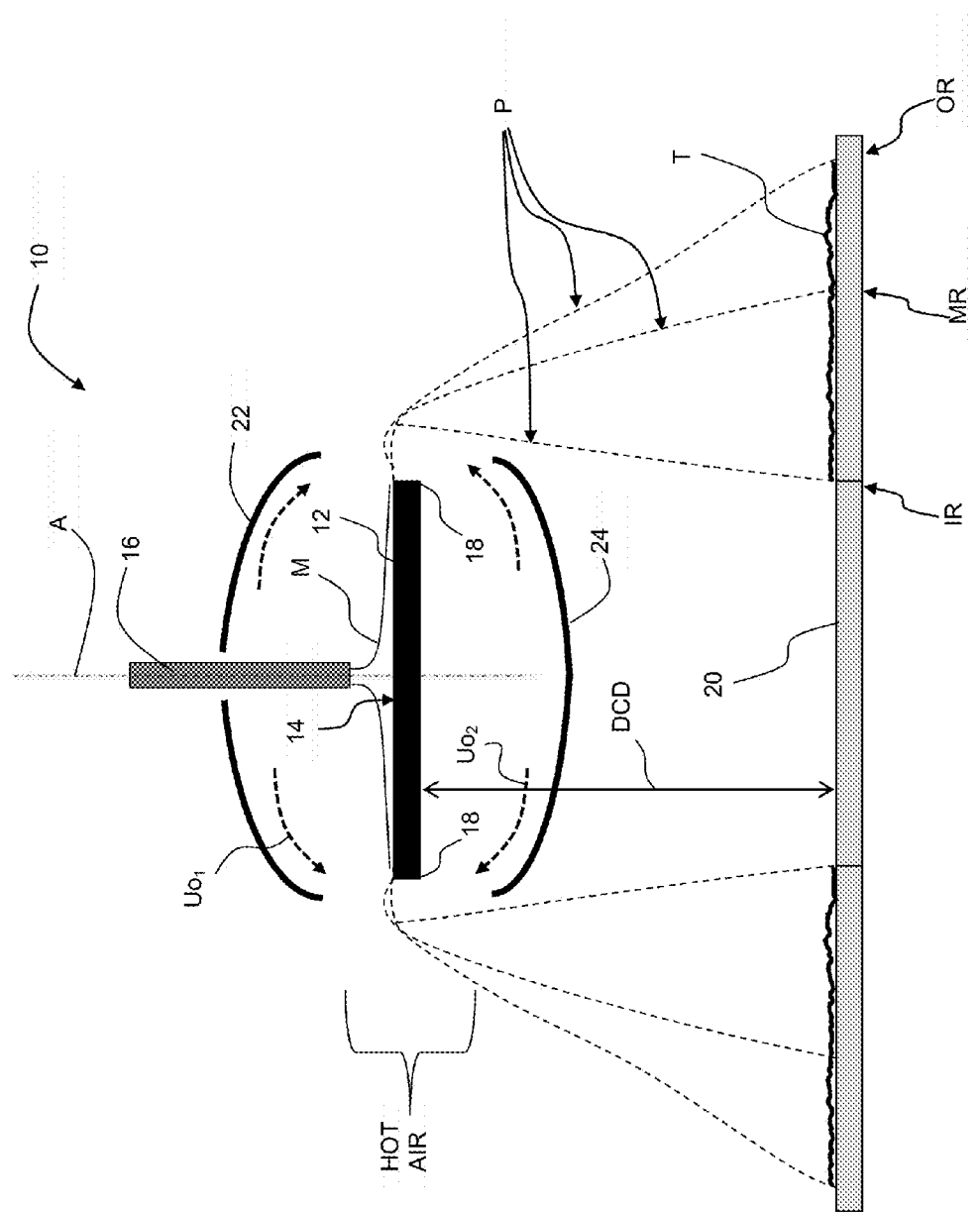
FIG. 1 is a schematic diagram illustrating a side view of an apparatus for forming particles according to one embodiment.

The embodiments shown in the figures are exemplary only, and should not be construed as limiting the scope of the present disclosure or claims.

SUMMARY OF VARIOUS EMBODIMENTS

According to one embodiment, a method of forming particles, comprising: performing a strong force attenuation of a mixture to form pre-particles, the mixture including a base compound and a dielectric additive having an elevated dielectric constant dispersed therein; then dielectrically spinning the pre-particles in an electrostatic field to further attenuate the pre-particles and form the particles. The strong force attenuation may include mechanically attenuating the mixture. In some embodiments, pre-particles may be micronic. In some embodiments, the particles are sub-micronic. In some embodiments, the base compound is a polymer.

In some embodiments, the method further comprises melting the polymer to form a liquid polymer melt, then dielectrically spinning the liquid polymer melt to form polymer particles.

In some embodiments, the mixture includes a dispersant selected to encourage the dielectric additive to disperse within the base compound.

In some embodiments, the pre-particles are formed using any suitable melt blown technique.

In some embodiments, the pre-particles are formed using a rotating disc.

According to another aspect, a composition for particle formation, comprising a base compound and a dielectric additive selected to encourage dielectrophoretic attenuation of the base compound during dielectric spinning.

In some embodiments, the dielectric additive includes a mild dielectric additive having a dielectric constant above 5. In some embodiments, the dielectric additive includes a moderate dielectric additive having a dielectric constant above 10.

In some embodiments, the dielectric additive includes a strong dielectric additive having a dielectric constant above 100.

In some embodiments, the dielectric additive includes polyglycerol-3. In some embodiments, the dielectric additive includes titanium dioxide ($TiO_2$). In some embodiments the dielectric additive includes barium titanate.

In some embodiments, the dielectric additive includes a ceramic dielectric. In some embodiments, the dielectric additive includes high-relative permittivity nanoparticles dispersed within the base compound.

In some embodiments the composition further comprises a dispersant selected to aid in dispersing the dielectric additive within the base compound. In some embodiments the dispersant includes sodium stearate. In some embodiments the dispersant includes sodium oleate.

In some embodiments the dispersant includes stearic acid. In some embodiments, the composition further comprises a viscosity-reduction additive selected to reduce the viscosity of the base compound. The viscosity-reduction additive may include Irgatec CR-76. The viscosity-reduction additive may include peroxide.

In some embodiments the composition further comprises a conductivity additive.

In some embodiments the composition further comprises an ionic liquid. In some embodiments the ionic liquid is mixed with the dielectric additive.

In some embodiments a conductive additive is mixed with the dielectric additive.

In some embodiments the composition is substantially solvent-free.

In some embodiments the composition comprises 85 to 99% by weight base compound, and 0.5 to 20% by weight dielectric additive.

In some embodiments the composition comprises 0 to 5% by weight dispersant.

In some embodiments the composition comprises 0 to 10% by weight viscosity-reduction additive.

In some embodiments the base compound is a polymer.

In some embodiments the polymer is a thermoplastic polymer.

In some embodiments the base compound is selected from a group consisting of: polyethylene; polypropylene; polycaprolactone; co-polymers of polyethylene-acrylic acid; polyacrylonitrile; polyamides; polybutadiene; polycarbonate; polychloroprene; polychlorotrifluoroethylene; poly(ethylene terephthalate); polyisoprene; poly(methyl methacrylate); polyoxymethylene; poly(phenylene oxide); polystyrene; polysulfones; polytetrafluoroethylene; poly(vinyl acetate); poly(vinyl chloride); polyester; wax; polypyrrole; polyaniline; poly(vinylidene chloride); poly(vinylidene fluoride); co-polymers; and blends.

In some embodiments the base compound is selected from the group consisting of: liquid polymers; molten glasses; molten metals; molten salts; minerals; ceramics; pure liquid substances; suspensions; emulsions; colloids; latex; solutions; and mixtures.

In some embodiments the dispersant is selected from the group consisting of sodium stearate and sodium oleate.

In some embodiments the dielectric additive is selected from the group consisting of: polyglycol; glycol; mannitol; ionic liquid; polycaprolactone; polyglycerol; glycerol; titanium dioxide; and barium titanate.

In some embodiments, the viscosity-reduction additive is selected from the group consisting of: Irgatec CR-76; peroxides; waxes; and lubricants.

According to another aspect, a method of forming particles, comprising: adding a dielectric additive to a base compound to form a mixture; and dielectrically spinning the mixture to form the particles.

In some embodiments the method further comprises mechanically attenuating the base compound before dielectrically spinning the mixture. In some embodiments mechanically attenuating the base compound forms particles larger than one micron, and the dielectric spinning forms particles smaller than one micron. In some embodiments the mechanical attenuation forms particles less than 12 microns in diameter. In some embodiments the mechanical attenuation forms particles less than 20 microns in diameter. In some embodiments the mechanical attenuation is performed using at least one rotating surface.

In some embodiments, the base compound is a polymer.

In some embodiments, the method further comprises melting the polymer to form a liquid polymer melt, then electrospinning the liquid polymer melt to form polymer particles.

In some embodiments the dielectric additives are added to the polymer before melting the polymer. In some embodiments the dielectric additives are added to the polymer after melting.

In some embodiments the method further comprises adding a dispersant selected to encourage the dielectric additive to disperse within the base compound.

In some embodiments the method further comprises mixing the dispersant and dielectric additive before the dielectric additive is combined with other ingredients.

In some embodiments the dispersant and dielectric additive are mixed, then combined with the base compound, and then mixed prior to melting the base compound.

In some embodiments the dispersant and dielectric additive are mixed, then combined with the base compound, and then mixed after melting the base compound.

In some embodiments the method further comprises adding a viscosity reducing additive to base compound.

In some embodiments the particles include fibers.

In some embodiments the particles include droplets.

In some embodiments the base compound is selected from the group consisting of: liquid polymers; molten glasses; molten metals; molten salts; minerals; ceramics; pure liquid substances; suspensions; emulsions; colloids; latex; solutions; and mixtures.

In some embodiments the method further comprises adding at least one additional compound. In some embodiments the at least one additional compound is selected from the group consisting of: carbon; activated carbon; super absorbent polymers; zeolites; bentonite; kaolin; diatomaceous earth chopped fibers; ion exchange resins; Teflon powder; adsorbents; absorbents; silicates; aluminas; minerals; ceramics; glass; and beads.

DETAILED DESCRIPTION OF VARIOUS EMBODIMENTS

As discussed in further detail below, various experiments were conducted by exposing different polymer compositions to an electrostatic field and observing the resulting particle sizes.

In general, it was observed that using a dielectric additive can greatly decrease the size of particles. More particularly, the effect of a dielectric additive on particle size, particularly a non-conductive dielectric additive such as barium titanate, appears to be significant (especially as compared to a conductive additive), and suggests that at certain particle sizes dielectrophoretic forces become dominant.

In some cases, very small particles may be formed in a two-part process in which a liquid mixture (which includes dielectric additives) is first mechanically attenuated to form pre-particles, particularly micronic pre-particles. These pre-particles are then subjected to an electrostatic field (e.g., dielectrically spun) to form smaller particles, particularly sub-micronic particles.

In general, the term "particles" as generally used herein includes fibers (e.g., filaments, ligaments, etc.), droplets, and other similar shapes made from any suitable liquid (e.g., polymer melts, etc.) and which may solidify, evaporate, and/or remain in liquid form.

"Electrospinning" conventionally refers to the production of particles (e.g., fibers or droplets) that are "spun" as fibers or "sprayed" as droplets by applying high electrostatic fields to one or more fluid spraying or spinning tips (e.g., emitters or spinnerets). The sprayed droplets or spun fibers are typically collected on a target substrate or collector plate positioned away from the emitters, in some cases by a distance of a few millimeters, a few centimeters or more.

A high voltage supply provides an electrostatic potential difference (and hence the electrostatic field) between the emitter (usually at high voltage, either positive or negative)

and the target substrate (usually grounded). In some embodiments, the spinning emitter can be grounded while a high voltage is applied to the substrate.

It is often desirable to produce particles of very small sizes, particularly particles having a diameter less than 1 micrometer (i.e., sub-micron particles).

Theoretically this should be possible with various known electrospinning processes based on laboratory results. However, in practice scaling up beyond the laboratory or prototype level of an electrospinning process that employs conventional, relatively conductive fluid compositions has proven to be problematic, particularly when trying to produce very small particles in large quantities.

One approach to small particle production is to dissolve a target particle material (e.g., a polymer) in a solvent. The solvent and target material are then subjected to an electrospinning process to form particles, after which the solvent will separate or evaporate from the particles to reduce the overall particle size.

However, this process can involve the use of fairly toxic solvents, and processing these solvents can be problematic, especially when generating significant quantities of particles. There are especially concerns about the dangers of ignition or combustion at elevated solvent concentrations.

Moreover, significant energy is expended to electrospin a material (the solvent) that is wasted using this technique, and the fiber production rates are normally quite small. In particular, the solvent normally contributes the bulk of the material (e.g., 80-85 wt %) while the polymer is normally between about 15-20 wt %. Thus, a large portion of the material composition in solvent electrospinning is simply wasted.

Conventionally, another approach to the production of very small fibers is achieved using conductivity-driven fiber attenuation of polymer melts, commonly referred to as melt electrospinning. However this approach typically requires that the polymer melt have a high electrical conductivity, which is hard to achieve as polymers tend to be insulative in nature.

One approach to increasing the electrical conductivity of a polymer melt is to add conductive additives to increase its electrical conductivity. For example, as discussed in PCT application no. PCT/CZ2011/000070 to Plistil et al., 1-25% by weight of a conductive agent can be added to a polymer melt.

However, these conductive additives can cause further problems. For example, conductive additives tend not to be thermally stable, and can break down at the elevated temperatures within a polymer melt, degrading fiber production. Furthermore, conductive additives can be very expensive, in some cases approaching eighty dollars per pound or more, and some may be highly toxic.

Finally, to achieve desired electrospinning performance, conductive additives may need to be included in very high concentrations. However, this can have a negative impact on the mechanical properties of the resulting particles, which is undesirable.

Accordingly, at least some of the teachings herein have been directed to the production of very small particles, particularly sub-micron fibers, without needing solvents or conductive additives.

Figure 2:
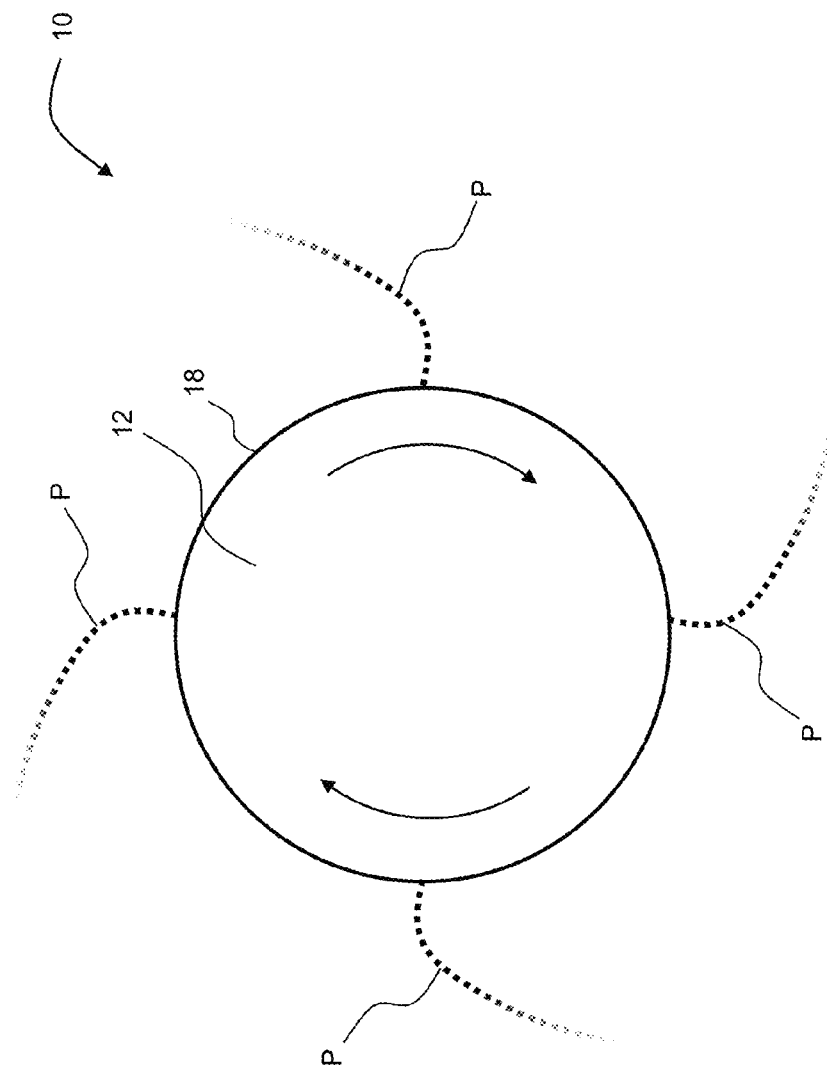
FIG. 2 is a top view of a rotating disc of the apparatus of FIG. 1.

Turning to FIGS. 1 and 2, illustrated therein is a schematic representation of an apparatus 10 for forming particles according to one embodiment.

The apparatus 10 generally includes at least one rotating surface, which in this embodiment is a rotating disc 12 with an upper surface 14. The apparatus 10 also includes a feed chamber or dispenser 16. As shown, the dispenser 16 is generally at or near the center of the disc 12 (e.g. at the axis of rotation A of the disc 12) and serves as a source for the liquid polymer used to feed the apparatus 10.

In particular, a liquid polymer (indicated generally as M) may be deposited from the dispenser 16 onto the surface 14 of disc 12 generally at the axis of rotation A. The deposited polymer M will then flow outwardly across the disc surface 14, generally as a thin film, due to the centrifugal forces generated by rotation of the disc 12.

For select operating conditions (e.g., rotational speeds, polymer feed rates, etc.), upon reaching the edge 18, the liquid polymer M will separate from the surface 14 of the disc 12 to form particles (indicated generally as P). In various embodiments, these particles P may include fibers (e.g. filaments, ligaments, fibrils, etc.), droplets, or particles of various other shapes and sizes.

An electrostatic field is then applied to further attenuate these particles P. For example, an electrostatic field may be generated between the disc 12 and a collector plate 20 positioned below the disc 12. Due to the electrostatic field, and when the liquid polymer M has a suitable composition, the particles P ejected from the disc 12 will attenuate within the electrostatic field so as to further reduce in size. For example, particles P may be ejected from the disc 12 with a size greater than one micron in diameter (e.g., greater than one micron but generally less than fifty microns), and then be further attenuated by the electrostatic field to have a diameter of less than one micron.

The particles P will normally be drawn down by the electrostatic field and deposit on a top surface of the collector plate 20, in some cases forming a particle mat T on the collector plate 20.

In some embodiments, an estimate of the electrostatic field strength for the apparatus 10 may be indirectly determined by a voltage-distance quotient, shown here as the disc-to-collector distance DCD between the collector plate 20 and the disc 12.

Generally, the particle mat T may be considered as having an inner region IR, an outer region OR, and a middle region MR. In some cases, the properties of the particles P deposited in each region will vary. For example, smaller particles may be slowed more quickly by the air surrounding the disc 12 and tend to collect in the inner region IR, while larger particles may have more inertia and travel further from the disc 12, tending to settle in the outer region OR (although in many cases the distribution of particle sizes can be highly variable across the regions of the mat T).

In some embodiments, hot or warm air may be introduced through one or more cowlings 22, 24 surrounding at least a portion of the disc 12 and the dispenser 16. For example, as shown hot air is ejected radially-outwardly from an upper cowling 22 above the surface 14 of the disc 12 and from a lower cowling 24 below the disc 12. This air can help promote attenuation of the particles P due to the momentum from the velocities $Uo_1$ and $Uo_2$ of the upper and lower air.

The hot air helps heat the disc 12 and dispenser 16 to maintain the polymer M in a liquid state, and more particularly at a temperature and viscosity that encourages the formation of small and stable particles P that separate from the edge 18 of the disc 12.

The hot air can also heat the ambient air surrounding the disc 12. This heating can encourage the molten particles P that have separated from the disc 12 to further attenuate within the electrostatic field before solidifying and depositing on the collector plate 20.

EXPERIMENTS

General Comments

A series of experiments were conducted making use of several different compositions of liquid polymers for particle production, particularly fiber production. These experiments were performed using an apparatus generally similar to the apparatus 10 of FIG. 1 in varying operating conditions as detailed below.

A relative assessment of the liquid polymer compositions was then performed by subsequently comparing observed results (e.g., aggregate mean fiber diameter estimates obtained from fiber samples for each respective polymer composition and fiber distributions).

In some cases, a particular polymer composition may be considered to be relatively more effective at attenuating fibers if the resulting aggregate mean fiber diameter, fiber distribution and/or standard deviation is generally smaller than that obtained from another polymer composition.

In some experiments discussed below, the hot air provided by the upper cowling was deactivated just prior to initiating particle formation. This was done to decrease the radial momentum exerted on the molten particles separating from the edge of the disc without significantly changing the polymer viscosity or ambient air temperature.

For the experiments discussed below, the disc-to-collector distance DCD was approximately 7.8 cm, while the disc was a 6" disc held at a constant speed of 2000 rpm. It should be noted that unless otherwise indicated, all experiments involved an active electrostatic field using the apparatus in a "cold-head" configuration, wherein high-voltage was applied to the collector plate 20 (+36 kV), while the dispenser 16 and rotating disc 12 were grounded. In particular, a positive voltage was applied to the collector plate 20, thus generating a negative electrostatic field with field lines directed from the collector plate 20 to the disc 12.

In some embodiments other electrostatic field configurations could be used (e.g. a "hot-head" configuration, wherein high-voltage is applied to the dispenser 16 and rotating disc 12, while the collector plate 20 is grounded). Moreover, the polarity of the applied voltage could be positive or negative in various different embodiments.

It has been observed that the field direction and polarity can have a marginal effect on the particle size. More particularly, it has been observed that a "hot-head" configuration may provide smaller particles in some operating conditions, particularly when a negative electrostatic field is generated, although this can be more challenging configuration to implement.

A fiber production rate may be characterized by measuring the mass of particles deposited on the collector plate within a particular period of time (e.g., within 1 minute). Since most experiments presented here were performed in the presence of an electrostatic field, the majority of the fibers produced were deposited on the collector plate with a marginal amount of stray fibers. Thus, for most embodiments, the "fiber production rate" can also be characterized as a "polymer deposition rate", or simply the "flow rate", since the mass of polymer was generally conserved.

On the other hand, for cases without an applied electrostatic field, many of the fibers were not deposited on the collector plate, but were instead deposited on other surfaces of the apparatus (e.g., a cover or lid of the apparatus). In such cases, the fiber production rate or deposition flow rate may be taken by collecting the fibers deposited on the various surfaces of the apparatus.

In general, it has been determined that statistically-steady average fiber diameter estimates can be obtained with reasonable certainty for a sample population of at least 100 fiber diameters (with a measurement uncertainty of approximately ±100 nm). For these experiments, an aggregate fiber diameter distribution and average were obtained by combining the fiber diameter distributions from the inner region IR, middle region MR and outer region OR. Sampling locations were selected such that the average was based on a sample population of at least 300 diameter measurements. The observed aggregate fiber distributions are reproduced in FIGS. 3 to 8 as discussed in greater detail below.

For greater certainty, Table 1 below lists various chemicals as discussed herein along with some associated properties. It should be noted that the functional properties of relative permittivity and conductivity are shown at room temperature and not in the presence of an electrostatic field. These relative permittivity and conductivity values are used as estimates since the experiments were conducted for a range of temperatures and voltage magnitudes within which these parameter values are unknown and may have varied.

It should also be noted that for the components sodium stearate and phosphonium-based ionic liquid, relative permittivity and conductivity parameters could not be determined. However the relative permittivity of stearic acid, which is chemically similar to sodium stearate, is believed to be approximately 2.7 as was used as prediction. Similarly, the relative permittivity of a phosphonium-based salt is approximately 10-15, while the conductivity of nitrogen-based imidazolium is 400 μS/cm; these properties were used as predictors for the ionic liquid.

TABLE 1

Chemical Ingredients

| Acronym | Chemical Identity | CAS number | Dielectric Constant/ Relative Permittivity | Conductivity [μS/cm] |
| --- | --- | --- | --- | --- |
| PP | polypropylene homopolymer (Metocene MF650Y) | 9003-07-0 | 2.3-2.7 | $3.38 \times 10^{-6}$ |
| IRGTC | hydroxylamine derivative (Irgatec CR-76) | trade secret | — | — |
| PG-3 | polyglycerol-3 | 25618-55-7 | 30 | — |
| SS | sodium stearate | 822-16-2 | 2.7 (stearic acid) | — |
| IL | trihexyl(tetradecyl)phosphonium bis 2,4,4-(trimethylpentyl)phosphinate (ionic liquid) | 465527-58-6 | 10-15 (phosphonium salt) | 400 (imidazolium ionic liquid) |
| $BaTiO_3$ | barium titanate | 12047-27-7 | 1750 | — |

Experiment 1

Pure Polypropylene

In a first experiment, fiber was collected in two tests 1a and 1b using an apparatus similar to the apparatus 10 described above. The base compound was 100% polypropylene (pure polypropylene), mixed at high shear at 265 degrees Celsius for 1 minute. Other parameters for these tests are listed below in Table 2: Polypropylene mixtures:

TABLE 2

Polypropylene mixtures

| Test ID | Mixture Composition | Flow Rate [g/min] | Voltage [kV] | $Uo_1/Uo_2$ [m/s] | Fiber Diameter Average [nm] | Fiber Diameter Standard Deviation [nm] |
|---|---|---|---|---|---|---|
| 1a | 100% PP | 1.6 | 0 | 4.0/4.3 | 5538 | 3941 |
| 1b | 100% PP | 1.8 | +36 | 4.0/4.3 | 10742 | 7818 |

Figure 3A:
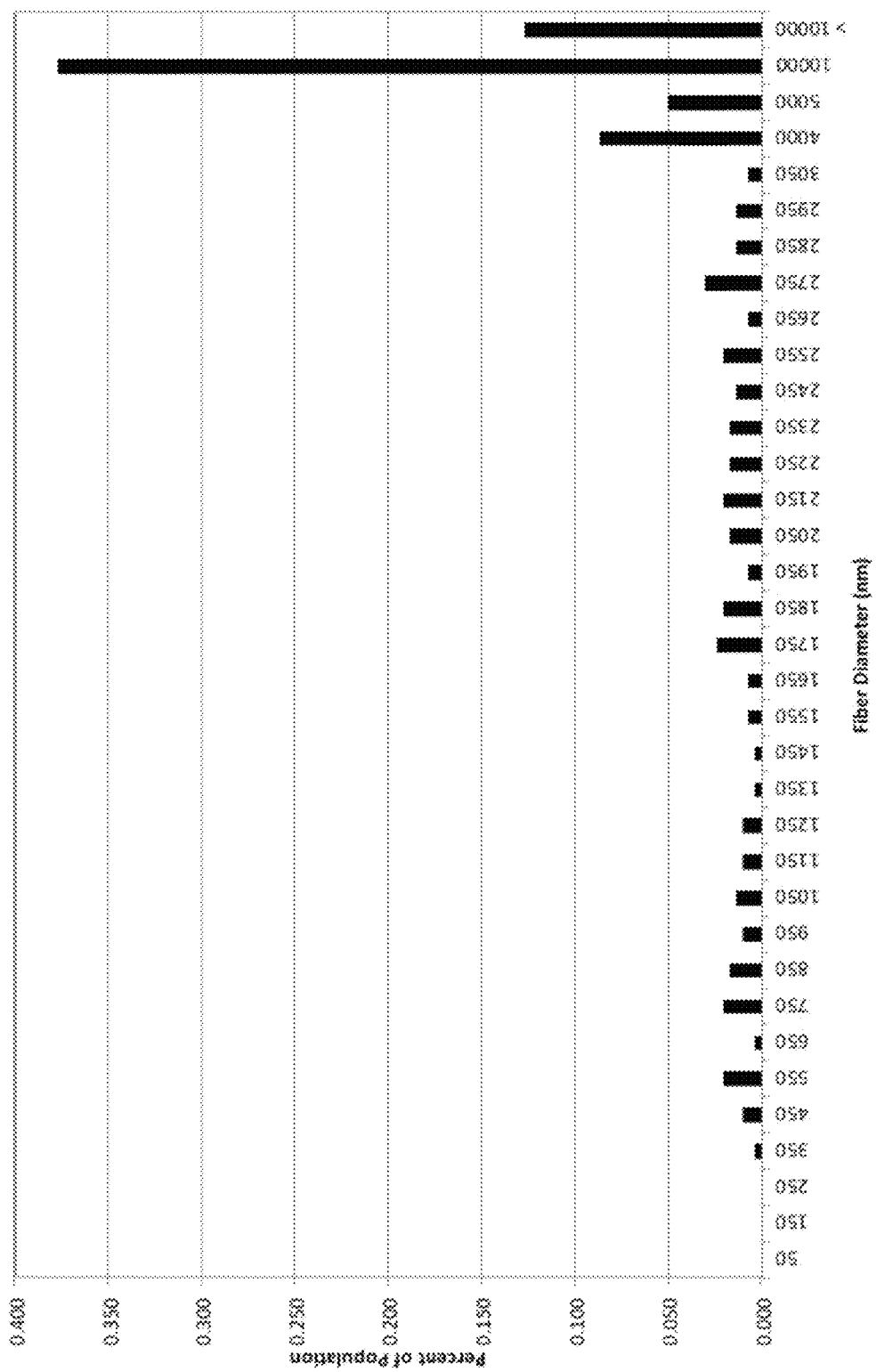
FIG. 3A is a graph of fiber distributions for pure polypropylene with no electrostatic field applied during fiber formation.
Figure 3B:
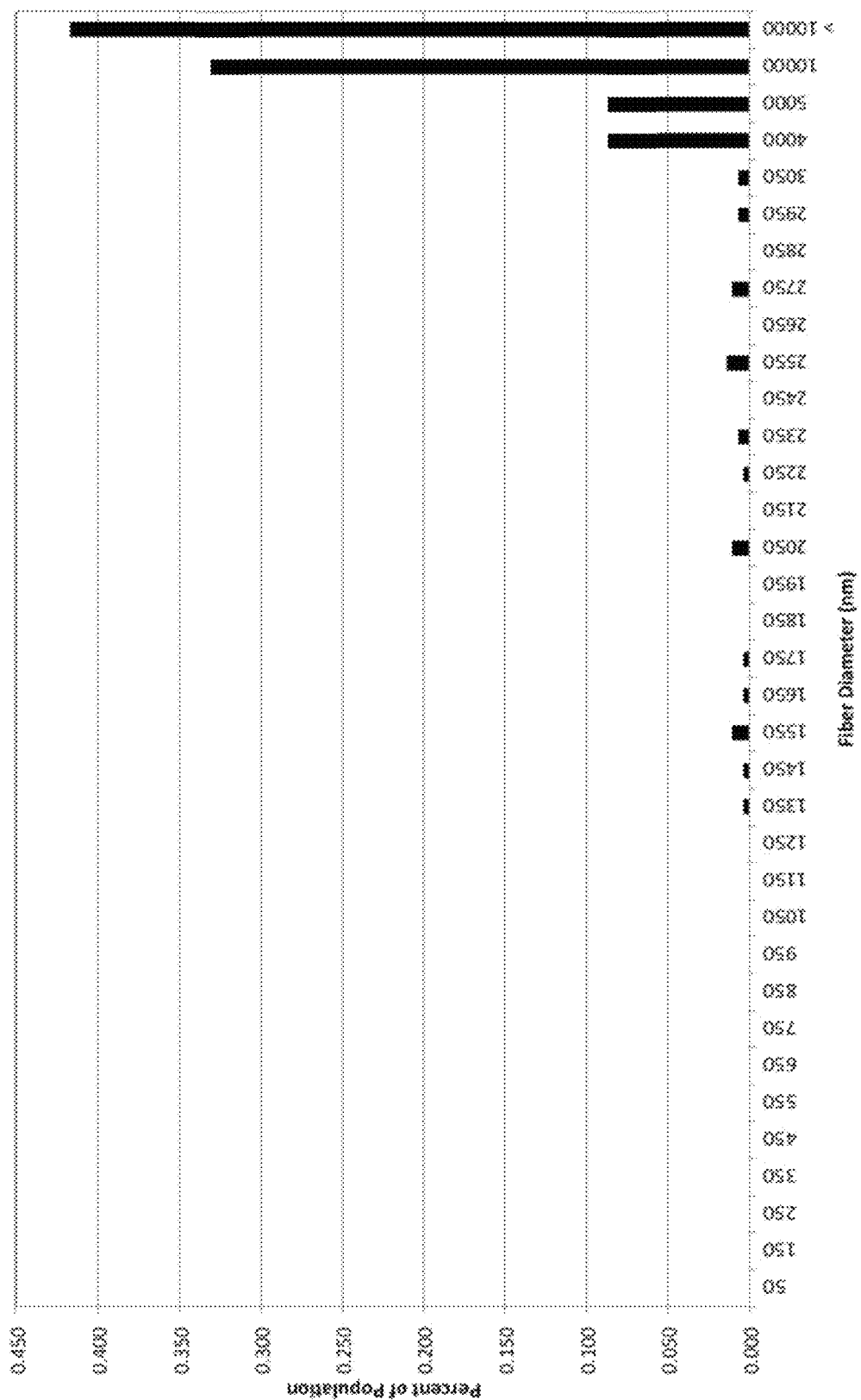
FIG. 3B is a graph of fiber distributions for pure polypropylene with an electrostatic field applied during fiber formation.

The resulting fiber diameter distributions are shown in FIG. 3A for the first test 1a without an electrostatic field and FIG. 3B for the second test 1b with an electrostatic field.

In both cases, the bulk of the fibers were micronic fibers, with fiber diameters greater than 1000 nanometers. In fact, the vast majority of fibers were larger than 4000 nanometers in diameter, while the average fiber diameters were over 5500 nanometers and 10700 nanometers.

In the first test 1a, without the electrostatic field, the fibers were ejected radially outwardly from the disc and followed an upward trajectory due to buoyant plumes and vortices of air, eventually collecting on a lid of the apparatus.

However, in the second test 1b, the fibers deposited on the collector plate due to the presence of the electrostatic field. These observations suggest that some surface charge exists on the pure polypropylene fibers, resulting in some fiber trajectory control when the polypropylene is exposed to the electrostatic field.

However, the surface charge appears fairly weak and is likely insufficient to attenuate pure polypropylene fibers to the desired small fiber sizes.

Experiment 2

Polypropylene with Viscosity Reduction Additive

The first experiment showed that micronic fibers were produced using a pure polypropylene melt, regardless of the presence of an electrostatic field. This suggests that the fibrils and other particles ejected from the rotating disc are initially fairly large, thus compromising the likelihood of attenuating ejected pure polypropylene particles and fibers to a sub-micronic size.

The second experiment investigated whether fiber diameter reduction could be promoted by decreasing the viscosity of the polymer melt using a viscosity-reduction additive. For this experiment, 5 wt % Irgatec CR-76 (5% by weight), produced by BASF, was selected as the viscosity-reduction additive and was added to the base compound (95 wt % PP). The polypropylene and Irgatec CR-76 were high-shear mixed together for 3 min at 265 degrees Celsius prior to being fed through the dispenser.

Additional parameters for the two tests with Irgatec CR-76 are shown in *upper cowling air (Uo1) turned off during particle formation

TABLE 3

Polypropylene and 5% Irgatec CR-76 mixture
Table 3: Polypropylene and 5% Irgatec CR-76 mixture. Both tests included the presence of an electrostatic-field, however in the first test (test 2a) the upper-cowling air ($Uo_1$) was deactivated during particle formation.

| Test ID | Mixture Composition | Flow Rate [g/min] | Voltage [kV] | $Uo_1/Uo_2$ [m/s] | Fiber Diameter Average [nm] | Fiber Diameter Standard Deviation [nm] |
|---|---|---|---|---|---|---|
| 2a | 95% PP 5% IRGTC | 0.7 | +36 | */4.3 | 2384 | 1808 |
| 2b | 95% PP 5% IRGTC | 3.7 | +36 | 4.0/4.3 | 7324 | 5439 |

*upper cowling air ($Uo_1$) turned off during particle formation

Figure 4A:
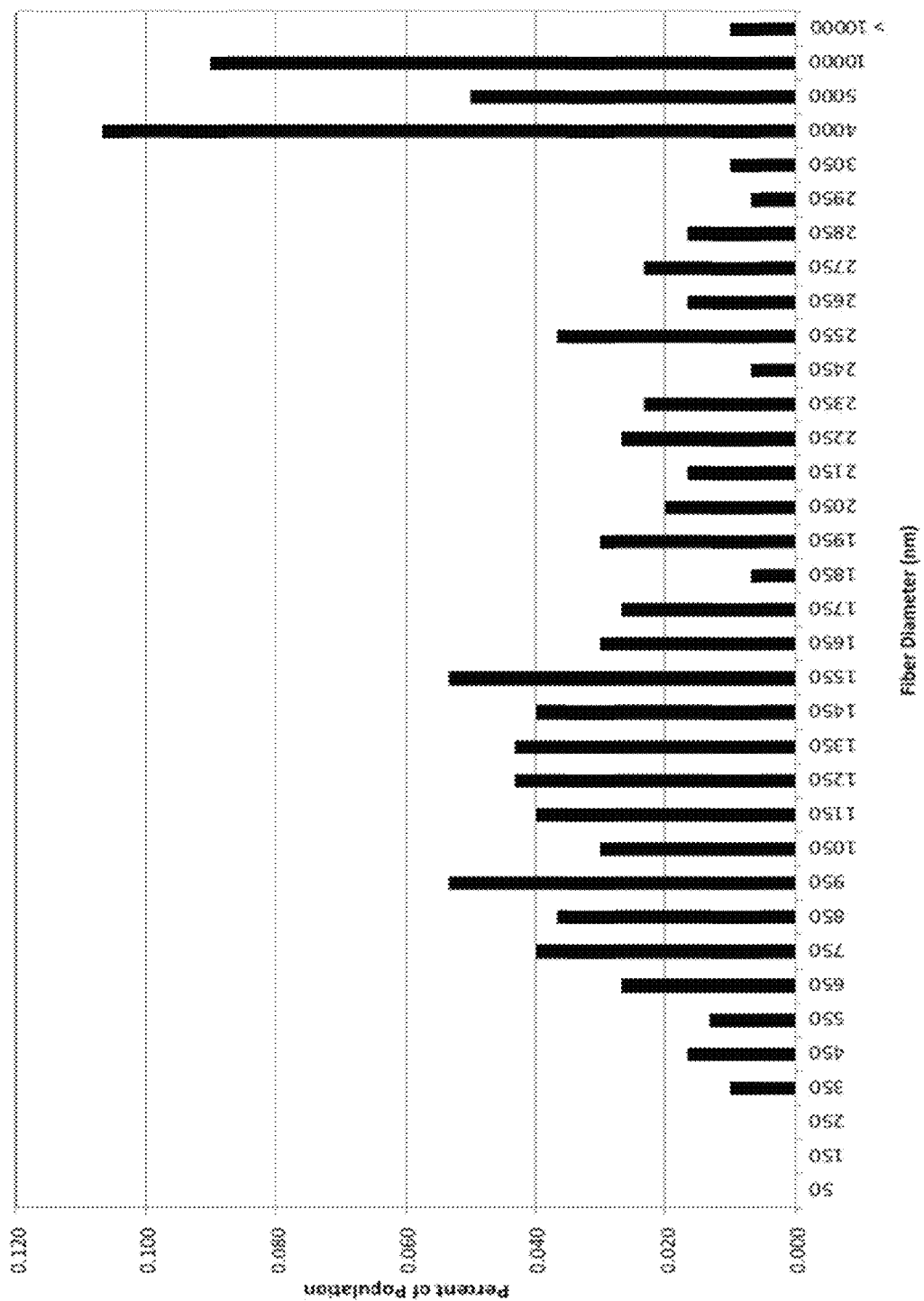
FIG. 4A is a graph of fiber distributions for a polymer composition including polypropylene and a viscosity reducing additive with upper cowling air deactivated during fiber formation.
Figure 4B:
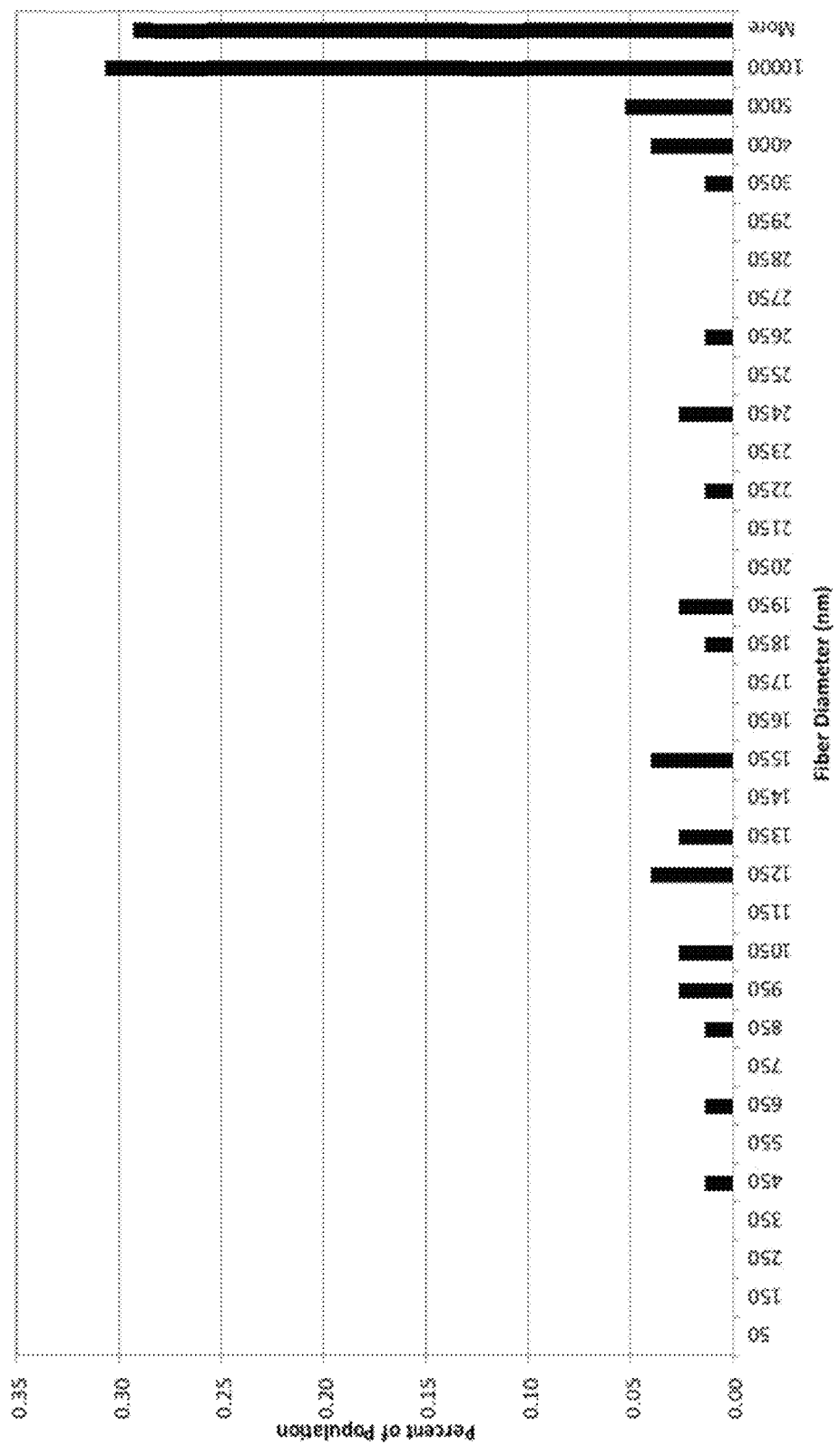
FIG. 4B is a graph of fiber distributions for the polymer composition from FIG. 4A with upper cowling air active during fiber formation.

The resulting fiber diameter distributions are shown in FIGS. 4A and 4B for the first test 2a and second test 2b, respectively.

In the first test, it is worth noting that with the upper cowling air deactivated, the polymer melt barely emerged from the dispenser, having a flow rate of only approximately 0.7 g/min.

On the other hand, when the upper cowling air was active during the second test, the flow rate increased to 3.7 g/min, more than double the flow rate of pure polypropylene at comparable operating conditions (see test 1b results). This suggests that 5 wt % Irgatec CR-76 reduces the viscosity of the polypropylene polymer melt.

However, it was also observed that the average fiber size increased from around 2300 nm to 7300 nm between the two tests. This is likely due to the low flow rate in the first test, since at a flow rate of only 0.7 g/min, the rotating disc was effectively "starved" of polymer, resulting in smaller fibers.

Further comparisons of tests 2b and 1b suggest that the viscosity-reduction additive reduces the average fiber size. However, the reduction is somewhat marginal, as with the Irgatec CR-76 the fibers were only about 3000 nm smaller than the pure polypropylene fibers. This marginal reduction suggests that while Irgatec CR-76 reduces polymer viscosity, this is insufficient to promote the desired fiber attenuation to sub-micronic particles.

Supplemental experiments (not detailed here) have confirmed that increasing the concentration of Irgatec CR-76 above 5 wt % could produce fibers with diameters in the range of 1000 nm to 3000 nm. However, no sub-micron fibers were obtained simply by increasing the Irgatec CR-76 concentration. Furthermore, at elevated Irgatec CR-76 concentrations, the resulting fiber strength seemed to decrease significantly. Thus, simply reducing the viscosity of a polymer melt may be insufficient to achieve the desired sub-micronic fibers.

Experiment 3

Dielectrophoretic-Driven Fiber Attenuation

The results of the second experiment suggested that in order to obtain sub-micronic particles or fibers, additional force mechanisms beyond centrifugal and aerodynamic forces may be necessary.

In the third experiment, tests were conducted using a polymer composition that added two additional components, a dielectric additive and a dispersant. In particular, the resulting composition included the base compound (e.g., polypropylene), a viscosity reduction additive (e.g., Irgatec CR-76), a dielectric additive (e.g., polyglycerol-3), and a dispersant (e.g., sodium stearate) selected to aid in dispersing the dielectric additive within the polymer melt.

For convenience, the combination of these four compounds in a polymer melt composition will be referred to as a "baseline" mixture, with various different concentrations of the compounds possible.

Additional parameters for these tests are listed in Table 4: Dielectric Driven Mixture (Baseline Mixture) below:

TABLE 4

Dielectric Driven Mixture (Baseline Mixture)

| Test ID | Mixture Composition | Flow Rate [g/min] | Voltage [kV] | $Uo_1/Uo_2$ [m/s] | Fiber Diameter Average [nm] | Fiber Diameter Standard Deviation [nm] |
|---|---|---|---|---|---|---|
| 3a | 90% PP 5% IRGTC 4% PG-3 1% SS | 4.2 | 0 | 4.0*/4.3 | 12737 | 2105 |
| 3b | 90.5% PP 4% PG-3 5% IRGTC 0.5% SS | 4.2 | +36 | 4.0*/4.3 | 620 | 908 |
| 3c | 94.5% PP 5% IRGTC 0.5% SS | 1.4 | +36 | 4.0*/4.3 | 7984 | 4244 |

*upper cowling air ($Uo_1$) turned off during particle formation

In the presence of an electrostatic field, it was suspected that the baseline mixture should respond to dielectrophoretic forces in addition to the centrifugal and aerodynamic forces.

Figure 5A:
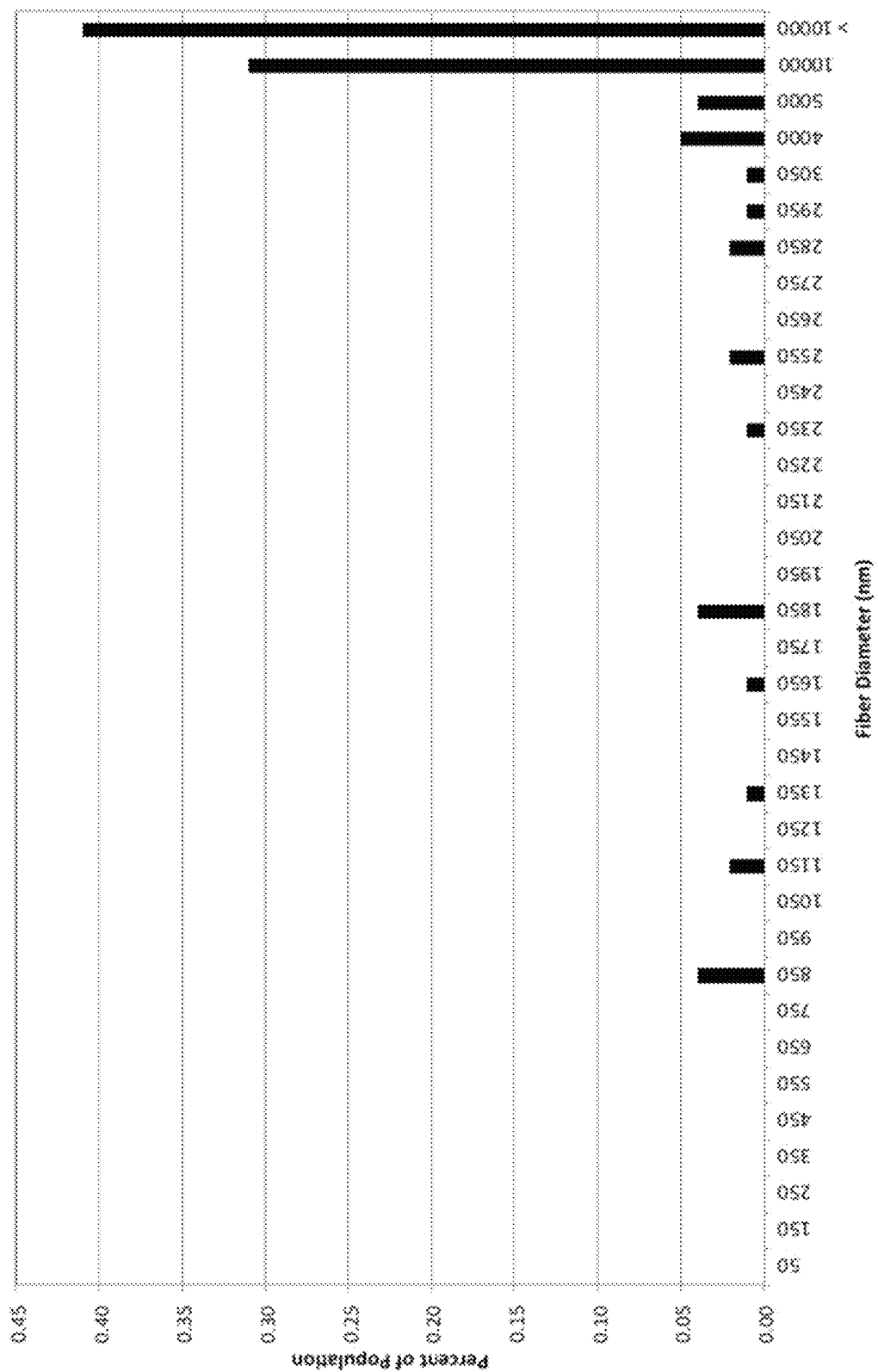
FIG. 5A is a graph of fiber distributions for a baseline polymer composition including a dielectric additive and a dispersant without an electrostatic field applied during fiber formation.
Figure 5B:
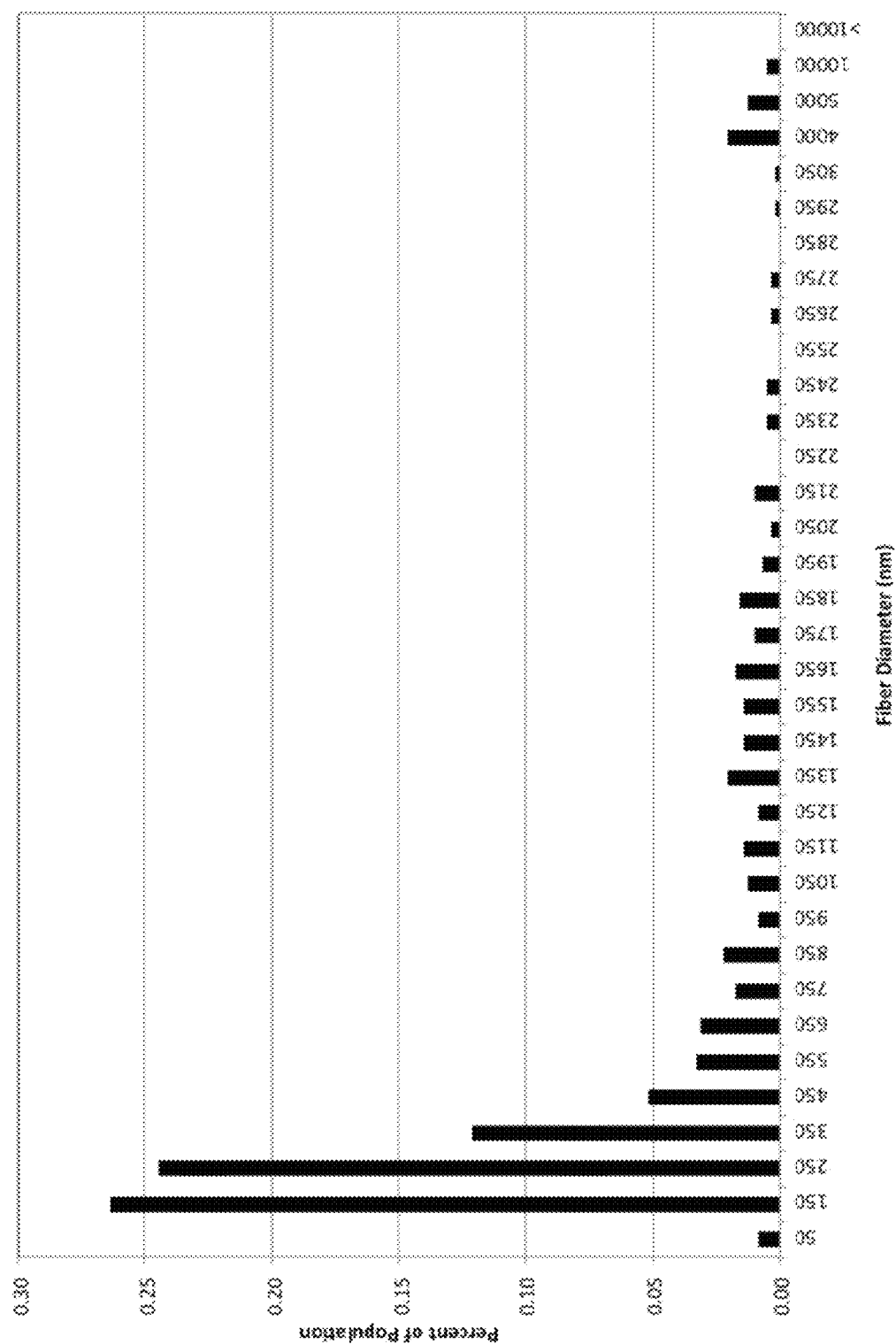
FIG. 5B is a graph of fiber distributions for the baseline polymer composition from FIG. 5A with an electrostatic field applied during fiber formation.

Experiments with baseline formulations were conducted in tests 3a and 3b without and with an electrostatic field, respectively. The resulting fiber distributions are shown in FIGS. 5A and 5B respectively.

Similar to the experiments performed with pure molten polypropylene, in the first test 3a (without an electrostatic field) the resulting fibers were generally micronic, with an average fiber diameter in excess of 12,000 nanometers.

However, the results were very different when the electrostatic field was applied. In particular, as evident by inspection of FIG. 5B, the electrostatic field resulted in a significant drop in the average fiber distribution for the baseline mixture in the second test 3b, and most observed fibers were less than 650 nm in diameter, with a substantial concentration below 250 nanometers.

Moreover, the average fiber diameter dropped from over 12,000 nm to around 620 nm, a reduction of about 95%.

These findings suggest that strong fiber attenuation has occurred due to the specific polymer composition. Based on an inspection of the functional properties of the ingredients for the baseline mixture (listed in Table 1 above), it appears that the dielectrophoretic force associated with the moderate dielectric additive material (polyglycerol-3) may be responsible for driving sub-micronic fiber attenuation.

To confirm this hypothesis, a further test 3c was performed in comparable operating conditions as in test 3b using a generally similar polymer composition but without the dielectric additive (i.e., no polyglycerol-3 was added to the composition).

Figure 5C:
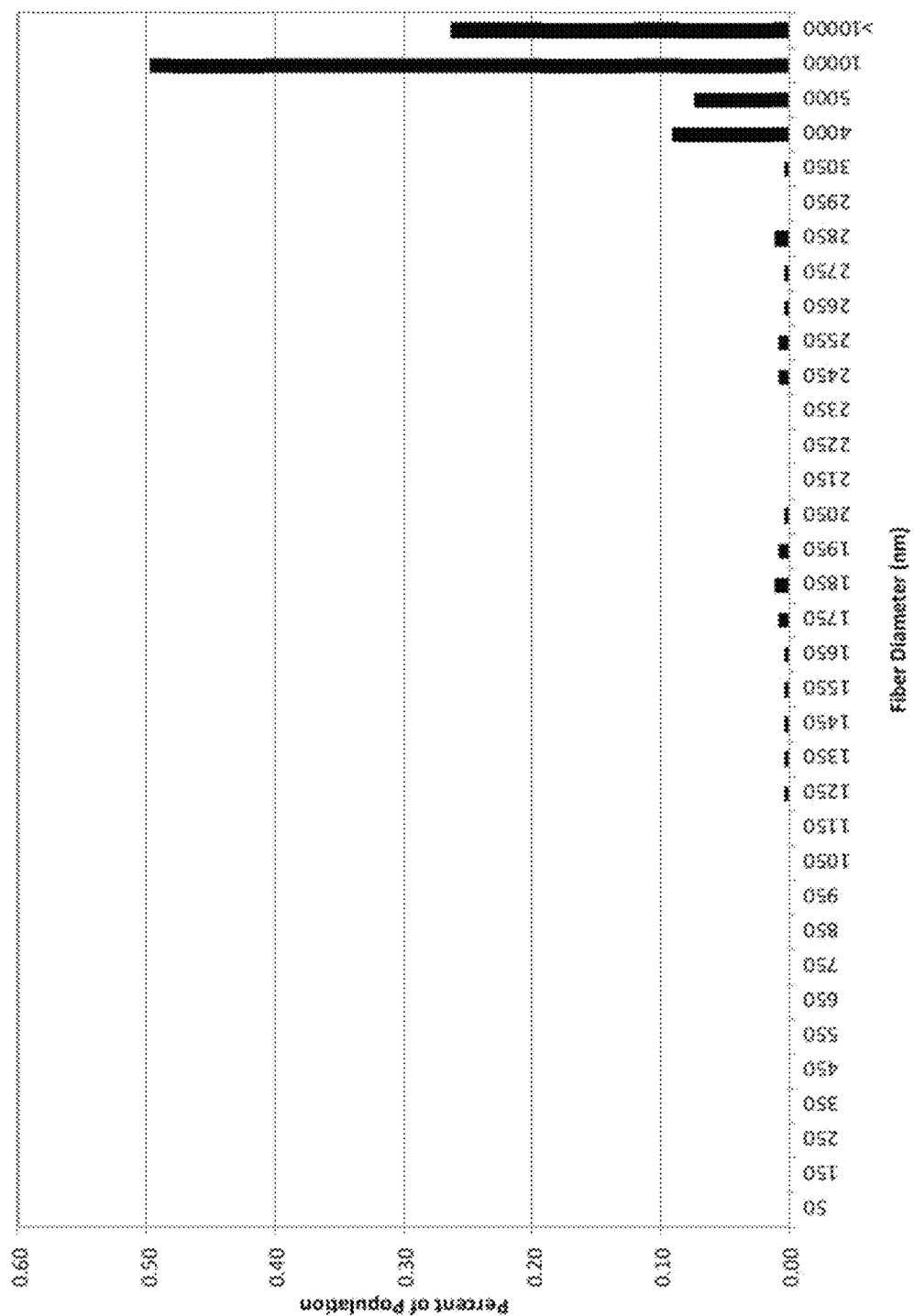
FIG. 5C is a graph of fiber distributions for a polymer composition including a dispersant but no dielectric additive with an electrostatic field applied during fiber formation.
Figure 6A:
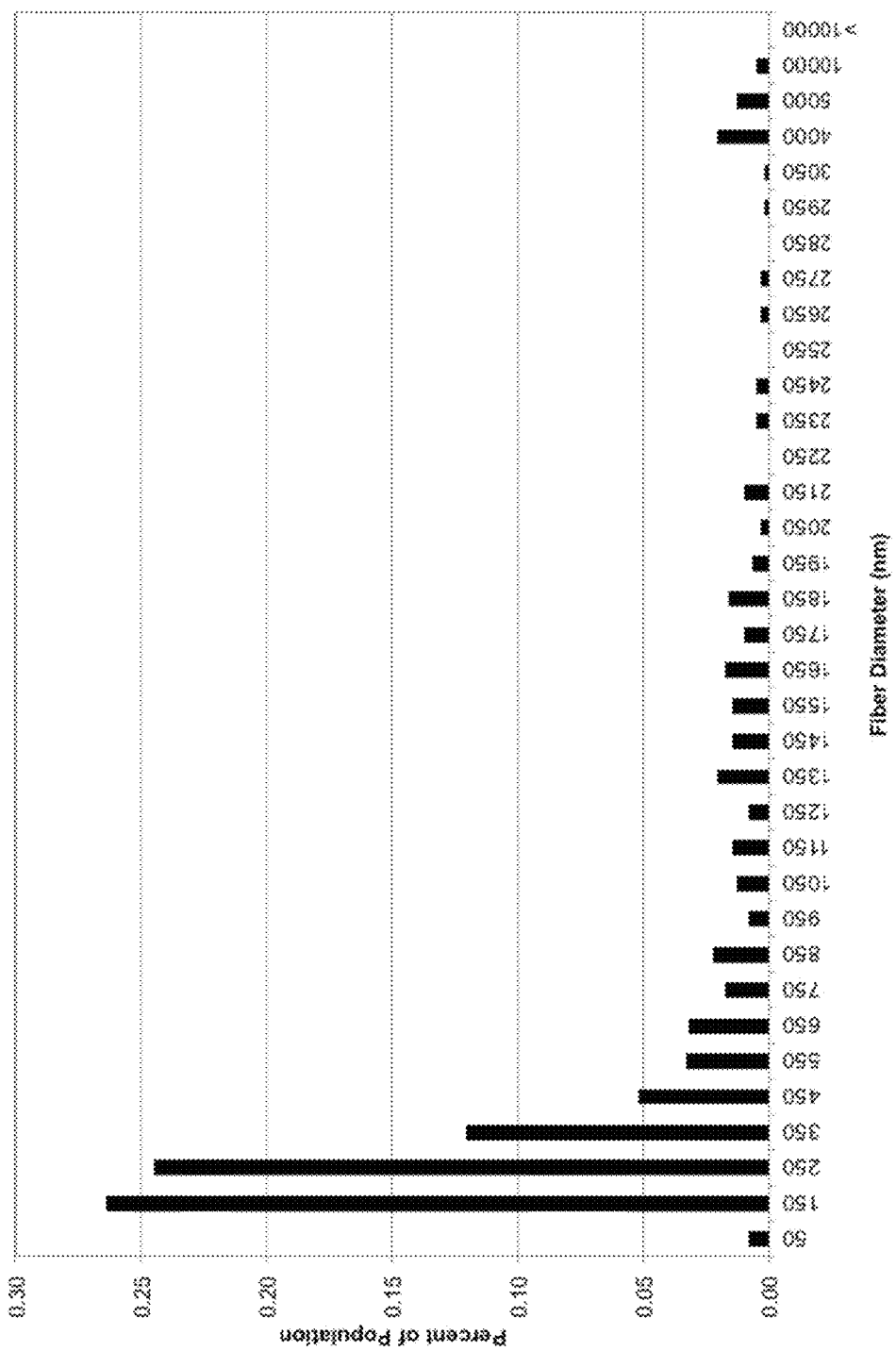
FIG. 6A is a reproduction of FIG. 5B shown for comparative purposes.
Figure 6B:
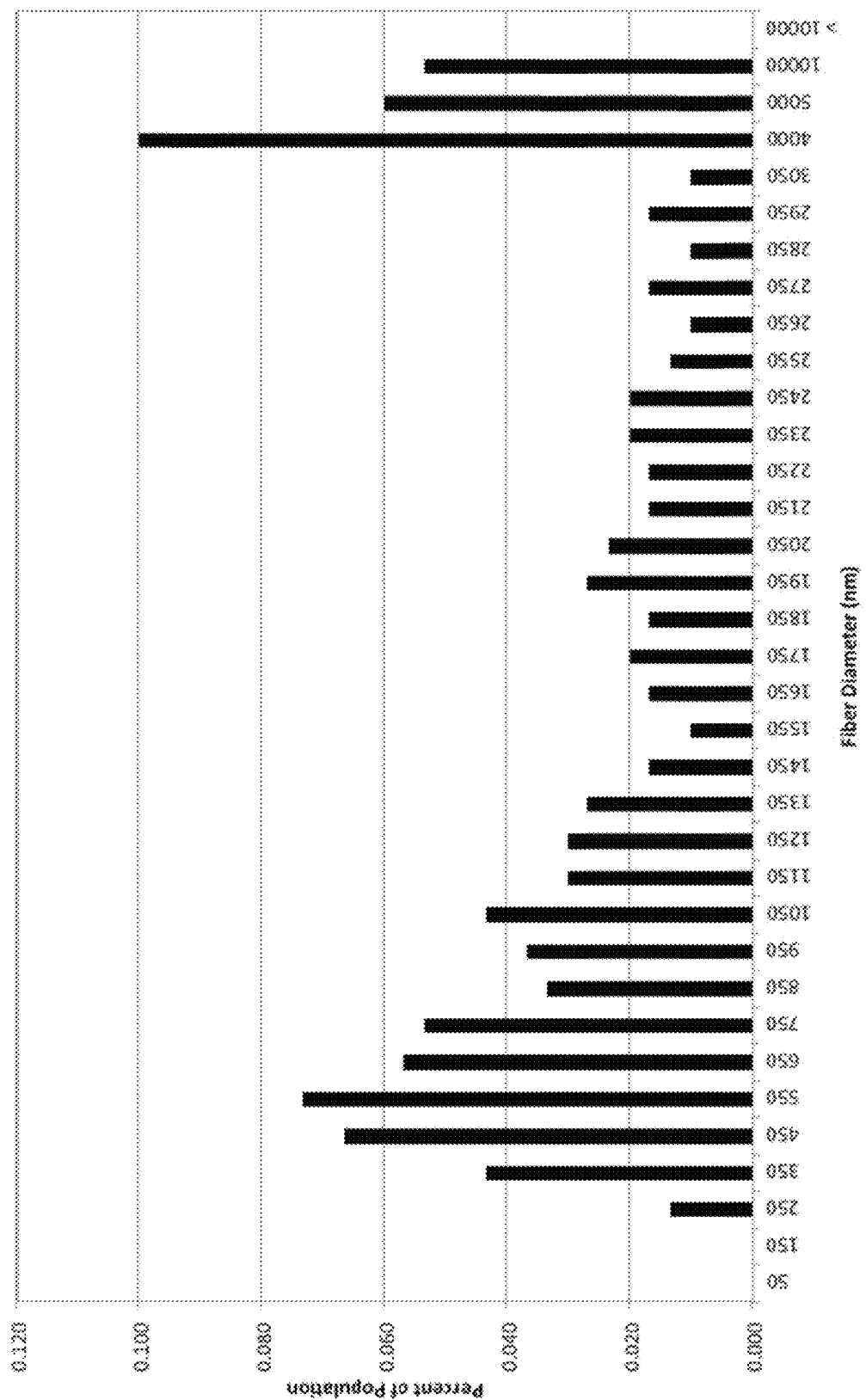
FIG. 6B is a graph of fiber distributions for a polymer composition including 2% ionic liquid.
Figure 6C:
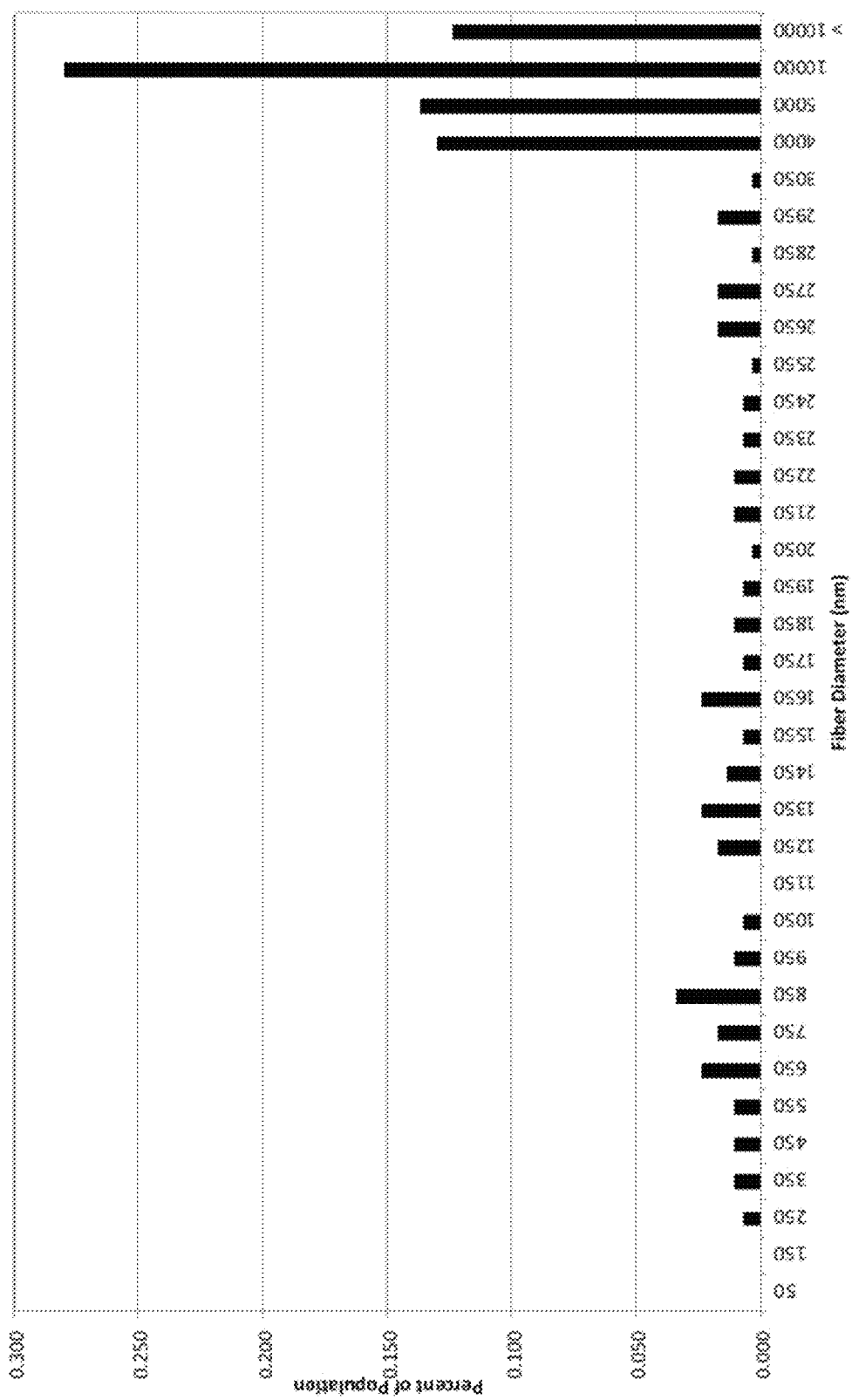
FIG. 6C is a graph of fiber distributions for a polymer composition including 5% ionic liquid.
Figure 6D:
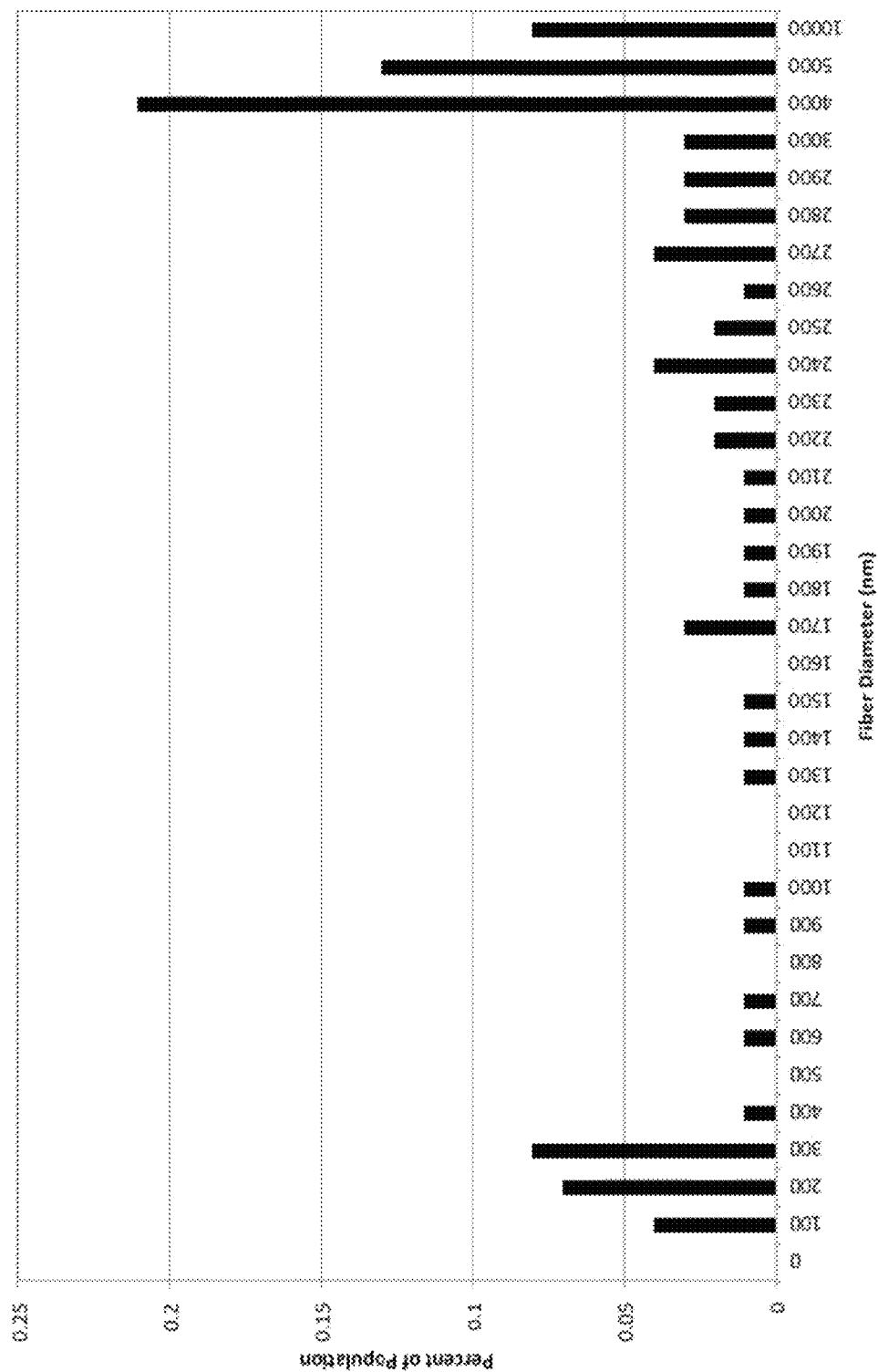
FIG. 6D is a graph of fiber distributions for a polymer composition including 10% ionic liquid.

FIG. 5C shows the resulting fiber diameter distribution for test 3c. As shown, the fibers were much larger, with most fibers having a diameter of over 4000 nanometers and with an average diameter of nearly 8000 nanometers.

This further suggests that it was the dielectric additive (e.g., the polyglycerol-3) that was largely responsible for the sub-micronic fiber attenuation, particularly due to the associated dielectrophoretic forces.

Additional tests were conducted (not detailed here) with a baseline formulation at 7 wt % polyglycerol-3 for a range of voltage magnitudes, without reviewing fiber distributions. Generally, as the voltage increased from +20 kV to +40 kV, the flow rate also increased (from 4.7 g/min to 7.2 g/min). This increase in flow rate suggests that increasing the electrostatic-field strength increases the dielectrophoretic forces in the material and the tendency to pull molten particles towards the collector plate.

Experiment 4

Ionic Liquid Mixtures for Conductivity Attenuation

Conventionally, sub-micron fiber production using polymer melts has been attempted using conductivity-driven fiber attenuation, commonly referred to as melt electrospinning. However, it has been challenging to make such processes work in a real-world setting, especially since it is difficult to make conductive polymer melts.

To explore conductivity-driven fiber attenuation, and in particular to compare that approach to the polymer composition in experiment 3, tests with phosphonium-based ionic liquid concentrations of 2%, 5%, and 10 wt % were performed (as presented in Table 5 below). For comparative purposes, the results of test 3b with a baseline composition are displayed in the same table.

TABLE 5

Ionic Liquid Mixtures

| Test ID | Mixture Composition | Flow Rate [g/min] | $Uo_1Uo_2$ [m/s] | Fiber Diameter Average [nm] | Fiber Diameter Standard Deviation [nm] |
|---|---|---|---|---|---|
| 3b | 90.5% PP 4% PG-3 5% IRGTC 0.5% SS | 4.2 | 4.0*/4.3 | 620 | 908 |
| 4a | 93% PP 5% IRGTC 2% IL | 2.7 | 4.0*/4.3 | 1934 | 1687 |
| 4b | 90% PP 5% IRGTC 5% IL | 4.6 | 4.0*/4.3 | 5076 | 3966 |
| 4c | 85% PP 5% IRGTC 10% IL | 4.2 | 4.0*/4.3 | 2674 | 1777 |

*upper cowling air ($Uo_1$) turned off during particle formation

Fiber distributions for the baseline test and for tests 4a, 4b, and 4c are shown in FIGS. 6A to 6D, respectively.

These results indicate that the inclusion of a conductive additive such as an ionic liquid does indeed have an effect on fiber attenuation, since there is a measurable fiber diameter reduction relative to pure polypropylene. However, comparing these results with the baseline formulation from test 3b suggests that the conductive additives (and the associated Coulomb force) have a much weaker effect on fiber attenuation relative to dielectrophoretic-forces provided by the dielectric additives.

In particular, it is notable that even at ionic liquid concentrations approaching 10 wt %, the average fiber size was over 2600 nanometers, and most fibers were micronic.

Experiment 5

Baseline Mixture Combined with Ionic Liquid

Experiments 3 and 4 indicated that fiber attenuation can be driven by both dielectrophoretic and Coulomb force mechanisms. Experiment 5 aimed to determine if the Coulomb forces (due to the conductive additives) could be coupled with dielectrophoretic forces with additive effect to drive fiber attenuation into a deeper sub-micron regime.

TABLE 6

Baseline Mixture with Ionic Liquid

| | | | | Fiber Diameter | |
|---|---|---|---|---|---|
| Test ID | Mixture Composition | Flow Rate [g/min] | $Uo_1Uo_2$ [m/s] | Average [nm] | Standard Deviation [nm] |
| 3b | 90.5% PP 4% PG-3 5% IRGTC 0.5% SS | 4.2 | 4.0*/4.3 | 620 | 908 |
| 5a | 88.5% PP 4% PG-3 5% IRGTC 0.5% SS 2% IL | 4.6 | 4.0*/4.3 | 609 | 1265 |
| 5b | 88.5% PP 4% PG-3 5% IRGTC 0.5% SS 2% IL | 3.1 | 4.0*/4.3 | 724 | 961 |

Two experiments were conducted with ionic liquid and polyglycerol-3 with the same compositions but different formulation preparation procedures. Specifically, for the first formulation in test 5a, ionic liquid was added to polyglycerol-3 and sodium stearate before combining with polypropylene and Irgatec CR-76 pellets and stirring these ingredients.

For the next test 5b, the ionic liquid was not mixed with polyglycerol-3 and sodium stearate, but instead was added to the Irgatec CR-76 and polypropylene pellets separately, followed by stirring of these collective ingredients.

Figure 7A:
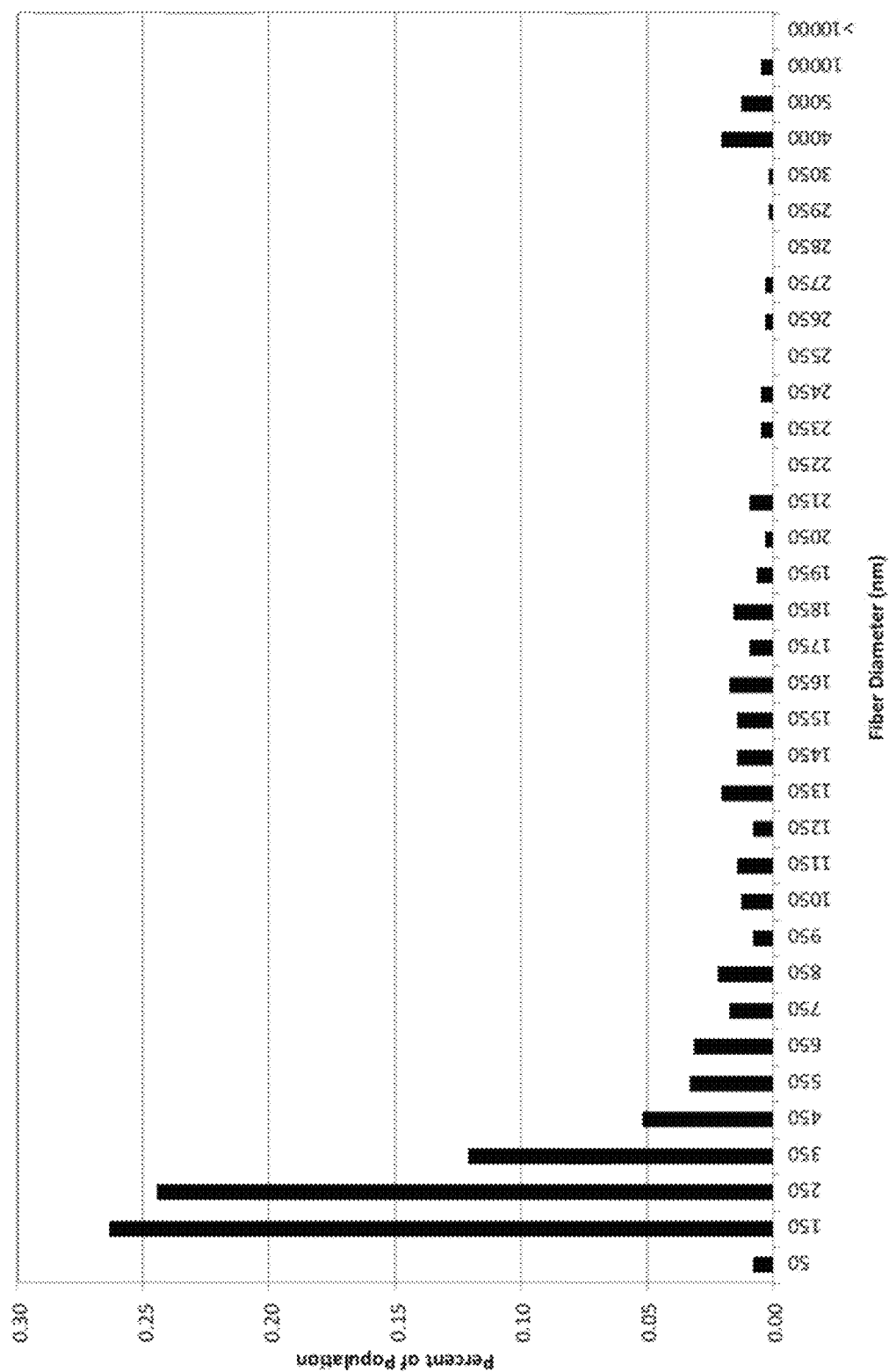
FIG. 7A is a reproduction of FIG. 5B shown for comparative purposes.
Figure 7B:
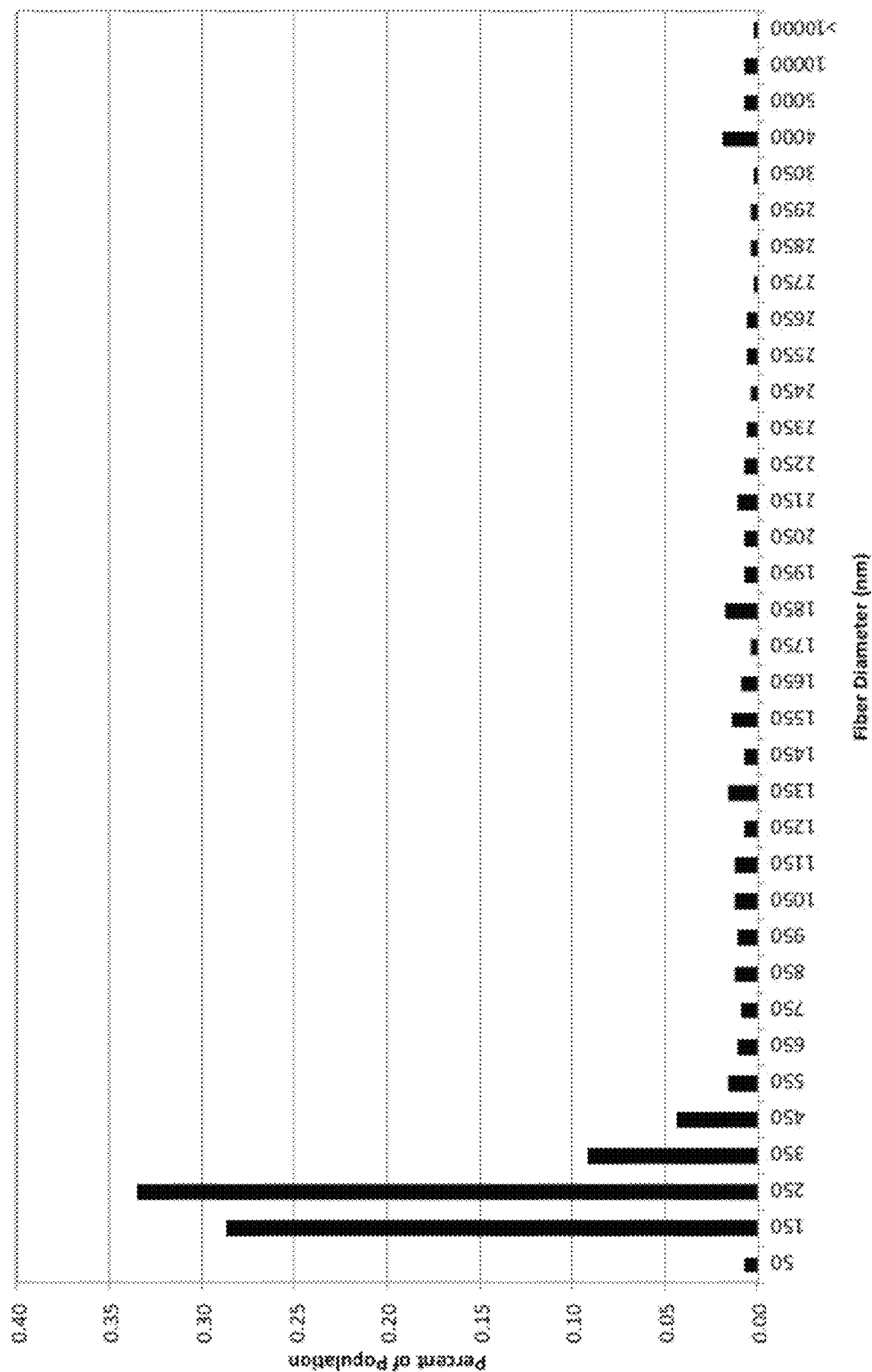
FIG. 7B is a graph of fiber distributions for a polymer composition with ionic liquid included within a polyglycerol-3 and sodium stearate dispersion.
Figure 7C:
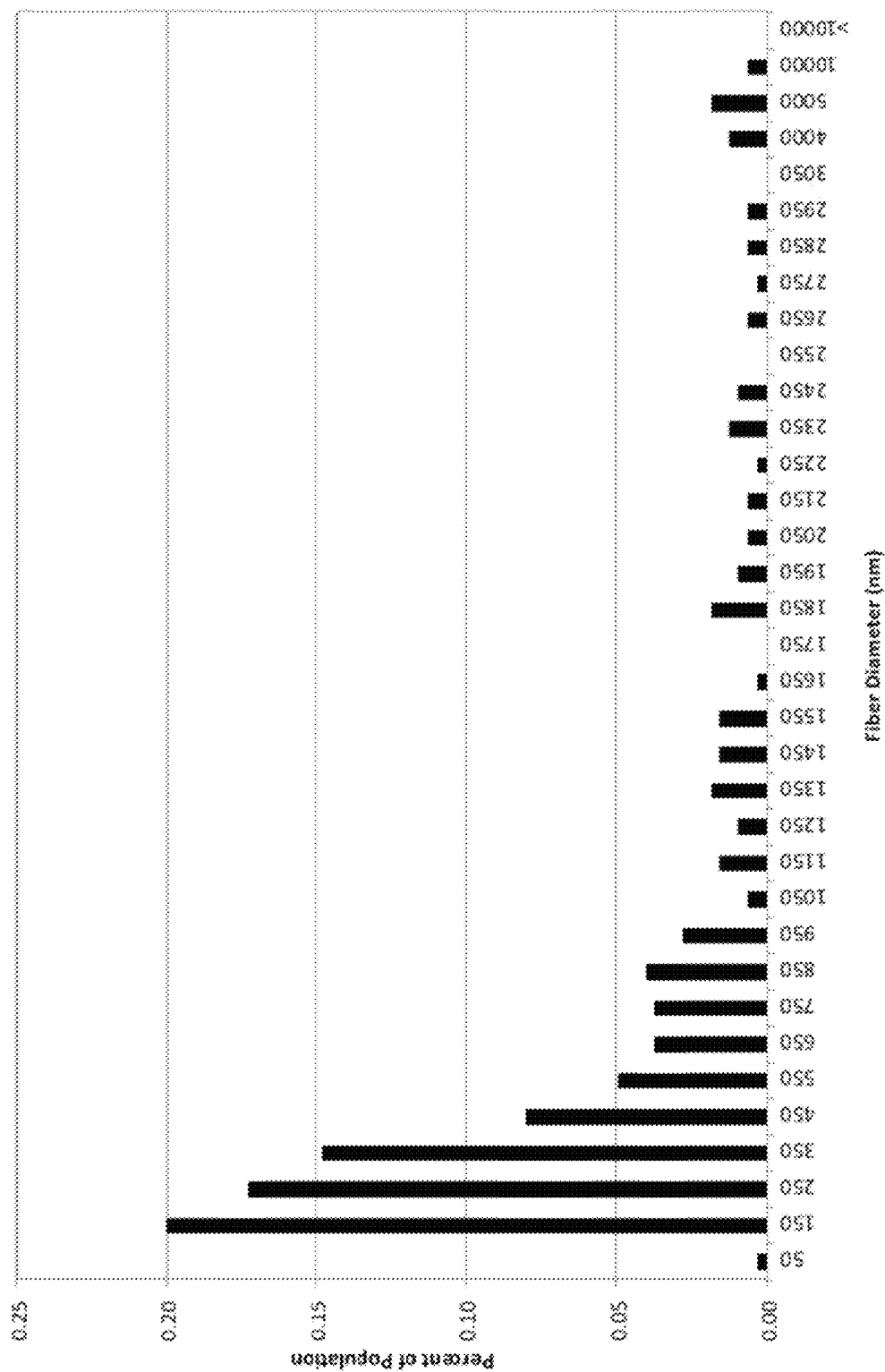
FIG. 7C is a graph of fiber distributions for a polymer composition with ionic liquid that is prepared according to a different mixing technique.

The corresponding fiber diameter distributions are shown in FIGS. 7B and 7C. The results of the first test 5a indicate that there is a marginal difference in the fiber size obtained when the ionic liquid is mixed with the dielectric additive and the dispersant. However, when the ionic liquid was added separately the result was actually an increase in fiber size.

These findings suggest that the addition of an ionic liquid results in a relatively weak force mechanism that does not significantly drive fiber attenuation any deeper. In fact, the attenuation due to dielectrophoretic forces appears to remain dominant.

Experiment 6

Baseline Mixtures with Ceramic Dielectric Additive

Experiments 4 and 5 suggested that conductivity-driven attenuation (e.g., due to conductive additives) is relatively weak in comparison to dielectrophoretic-driven attenuation (e.g., due to dielectric additives).

To investigate this further, a high relative permittivity (dielectric constant) ceramic particle (50 nm barium titanate, $BaTiO_3$) was added to the baseline mixture to further drive attenuation by attempting to enhance dielectrophoretic forces.

Barium titanate has very high relative permittivity (dielectric constant) of approximately 1750, and is not considered to be an especially good conductor. In particular, when barium titanate is dispersed at concentrations of less than 1 wt % in molten polymer, this ceramic powder makes no contribution to the bulk conductivity of the polymer.

TABLE 7

Baseline Mixture with Ceramic Dielectric

| | | | | Fiber Diameter | |
|---|---|---|---|---|---|
| Test ID | Mixture Composition | Flow Rate [g/min] | $Uo_1Uo_2$ [m/s] | Average [nm] | Standard Deviation [nm] |
| 3b | 90.5% PP 4% PG-3 5% IRGTC 0.5% SS | 4.2 | 4.0*/4.3 | 620 | 908 |
| 6a | 90% PP 4% PG-3 5% IRGTC 0.5% SS 0.5% $BaTiO_3$ (50 nm) | 3.3 | 4.0*/4.3 | 431 | 641 |

*upper cowling air ($Uo_1$) turned off during particle formation

Figure 8A:
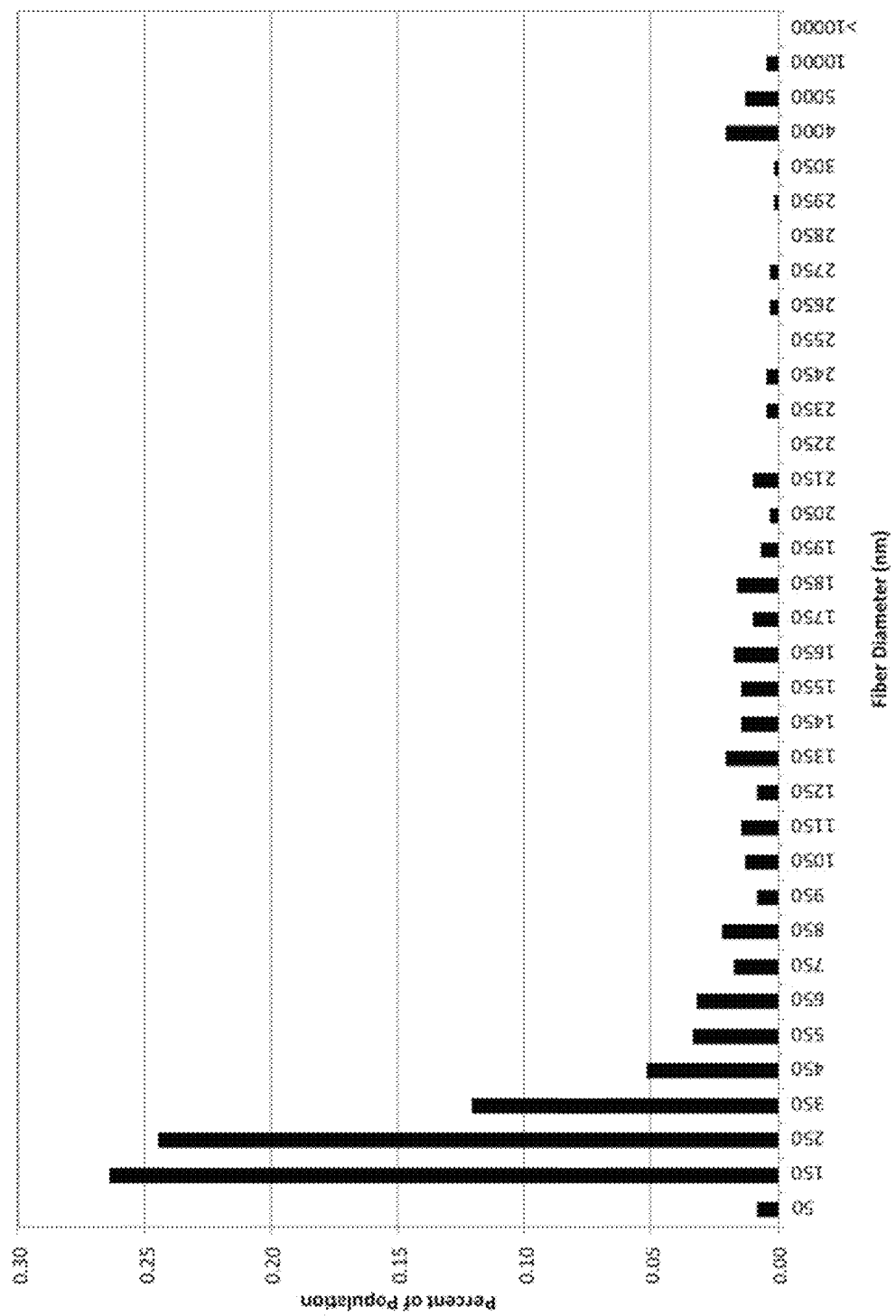
FIG. 8A is a reproduction of FIG. 5B shown for comparative purposes.
Figure 8B:
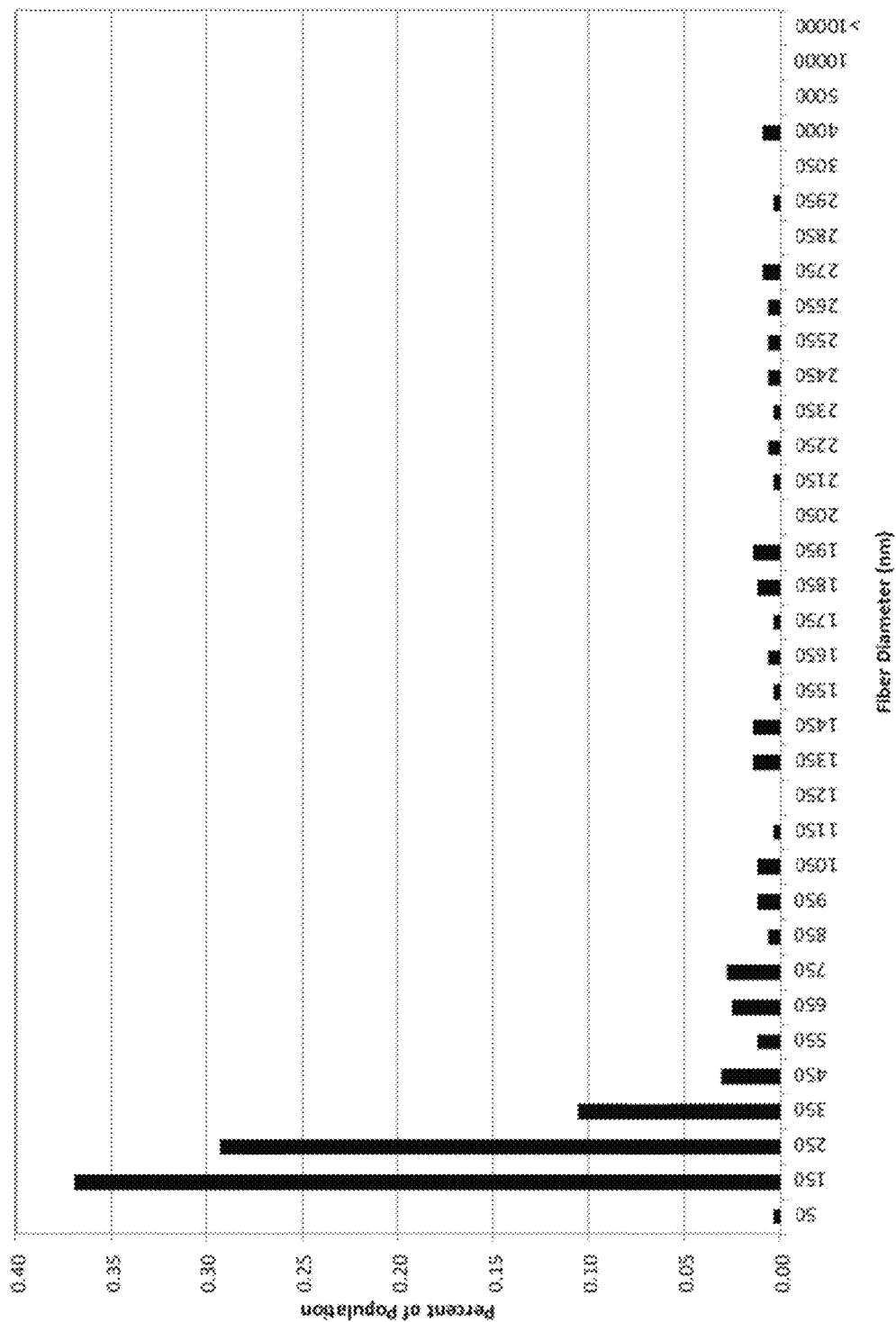
FIG. 8B is a graph of fiber distributions for a polymer composition including dielectric ceramic particles.

The results for this experiment are shown in Table 7 for the baseline mixture alone and with added barium titanate ($BaTiO_3$). Fiber distributions are shown in FIGS. 8A and 8B.

For comparable operating conditions, adding barium titanate yielded a measurable reduction in the average fiber diameter from 620 nm to 431 nm. Inspection of the fiber diameter distribution in detail suggests that the reduction in fiber diameter is largely due to the further attenuation of larger micronic fibers to smaller sub-micronic fibers, as evidenced by the decrease in the micronic fiber population in FIG. 8B.

In addition, the population of fibers centered around 150 nm increased by approximately 10%, which suggests that the barium titanate does contribute to relatively deep sub-micronic fiber attenuation.

However, sub-micronic fiber formation below approximately 150 nm was not observed. This suggests that a lower attenuation-limit may have been reached for this particular polymer composition.

There are several theories that may explain this. First, since the viscosity of a polymer melt increases rapidly as the particles separate from the disc and quickly transition from a hot region (on the disc) to a colder region (in ambient air), there may be insufficient time for the particles to fully attenuate in the presence of $BaTiO_3$.

Furthermore, the $BaTiO_3$ particles used in this experiment are rather large (approximately 50 nm in diameter), which may have impeded the reduction of fiber sizes due to poor barium titanate dispersion within the polymer melt.

It may also be more difficult to generate a motive dielectrophoretic force in a large barium titanate particle to stimulate sufficient momentum to overcome viscous forces in polymer melt. However, if a smaller diameter high-relative permittivity nanoparticles can be adequately dispersed within a polymer melt, it may be possible to drive particle sizes even smaller than is presently observed

Summary of Experimental Results and Discussion

The results for the six experiments and the observed attenuation mechanisms are summarized in Table 8 below.

In general, various degrees of attenuation of polymer particles may be achieved via centrifugal, aerodynamic, Coulombic and dielectrophoretic mechanisms. However, as discussed above, particularly with reference to experiments 3 to 6, dielectrophoretic attenuation (through the addition of dielectric additives) appears to be particularly suitable for generating sub-micronic particles and fibers.

TABLE 8

Summary of Experimental Test Cases

| Test Case | Description | Attenuation Mechanisms |
|---|---|---|
| Experiment 1 | PP | centrifugal<br>aerodynamic |
| Experiment 2 | PP + viscosity reduction additive | centrifugal<br>aerodynamic |
| Experiment 3 | PP + viscosity reduction additive + dielectric additives | centrifugal<br>aerodynamic<br>dielectrophoretic |
| Experiment 4 | PP + viscosity reduction additive + conductive additives | centrifugal<br>aerodynamic<br>Coulomb |
| Experiment 5 | PP + viscosity reduction additive + dielectric & conductive additives | centrifugal<br>aerodynamic<br>dielectrophoretic<br>Coulomb |
| Experiment 6 | PP + viscosity reduction additive + multiple dielectric ingredients (with strong dielecic contrast) | centrifugal<br>aerodynamic<br>dielectrophoretic |

Therefore, it would appear that various compositions that include dielectric additives may provide for good production of small particles, particularly sub-micronic particles.

In some embodiments, a suitable composition for particle formation can generally be described as including a base compound (e.g., a polymer or another suitable target material for the particles) and at least one dielectric additive.

The dielectric additive should be selected to encourage dielectrophoretic attenuation during spinning of the base compound within an electrostatic field (e.g., dielectric spinning) when the base compound is in a liquid form (e.g., a polymer melt). In particular, the dielectric additive should have a dielectric constant that is higher than the dielectric constant of the base compound, particularly for the operating parameters of the spinning apparatus (e.g., elevated temperatures, etc.).

In general, the process of spinning in an electrostatic field in the presence of a dielectric additive can be referred to as "dielectric spinning".

In general, the dielectrophoretic mechanism in dielectric spinning is not enhanced by using an electrically conductive base compound. In fact, dielectric spinning may be positively enhanced when the conductivity of the mixture is very low, and in particular generally much lower than the conductivity of liquids normally used in conventional electrospinning techniques.

In fact, there may be no particular advantage to using a base compound or mixture with an elevated electrical conductivity, as dielectric spinning may in fact favor fluids with low electrical conductivity.

In different embodiments, the dielectric additive could have different properties. For example, the dielectric could be a mild dielectric (e.g., defined as having a dielectric constant above 5), a moderate dielectric (e.g., defined as having a dielectric constant above 10), or a strong dielectric (e.g., defined as having a dielectric constant above 100). In some cases, the dielectric additive may have a dielectric constant above 1000 or more.

In some embodiments, possible dielectric materials for use in dielectric spinning could include one or more of the materials listed below in Table 9.

TABLE 9

Alternative Dielectric Additive Materials

| Material | Conductivity [μS/cm] | Relative permittivity/ dielectric constant (approx.) |
|---|---|---|
| ionic liquid | 400 | 10-15 |
| Polycaprolactone | | |
| Polyglycerol | | 30 |
| glycerol | | 40 |
| titanium dioxide ($TiO_2$) | 4000 | 86-173 |

In some compositions, a dispersant (e.g., sodium stearate, sodium oleate) may be added to aid in dispersing the dielectric additive within the base compound. In particular, it may be beneficial for the dielectric additive to be homogenously dispersed within the base compound, and the dispersant may encourage such dispersion.

In some compositions, other compounds (e.g., viscosity reducing additives, conductive additives, etc.) can be added to the composition, for example as generally described above. For a polymer, some viscosity reducing additives could include Irgatec CR-76, peroxides, or generally anything that decreases the molecular weight of the polymer chains in a polymer melt, or lubricants.

In general, such compositions can be electrically attenuated without the need for solvent, and thus are generally "solvent-free". In general, "solvent-free" generally means that the composition does not include a significant amount of solvent.

More particularly, as compared with other known techniques, in dielectric spinning the compounds in the polymer composition are truly blended, and there is little or no "ejection" or "evaporation" of any of the components after the particles have been formed. The finished particles and fibers will thus include both the base compound, the dielectric additive, and any dispersants or other compounds generally added to the composition before dielectric spinning.

In some embodiments, a generally insignificant or trace amount of solvent may still be present in a composition considered "solvent-free". For example, a composition may contain less than 0.5 wt % solvent or less than 0.1 wt % solvent.

In various embodiments, suitable compounds can contain different concentrations of the various components. For example, in one embodiment a suitable compound may include 85 to 99% by weight base compound (e.g., polypropylene or another polymer), and 0.5 to 20% by weight dielectric additive (e.g., triglycerol, glycerol). The composition might also include 0 to 5% by weight dispersant, and 0 to 10% by weight viscosity-reduction additive.

In some embodiments, the base compound includes a polymer, particularly a thermoplastic polymer.

Some examples of suitable polymers could include polyethylene and polypropylene. Other suitable polymers could include polycaprolactone, co-polymers of polyethylene-acrylic acid, polyacrylonitrile, polyamides, polybutadiene, polycarbonate, polychloroprene, polychlorotrifluoroethylene, poly(ethylene terephthalate), polyesters of various compositions, polyisoprene, poly(methyl methacrylate), polyoxymethylene, poly(phenylene oxide), polystyrene, polysulfones, polytetrafluoroethylene, poly(vinyl acetate), poly(vinyl chloride), poly(vinylidene chloride), and/or poly(vinylidene fluoride), as well as co-polymers or polymer blends of all sorts.

In other embodiments, the base compound may not be a polymer. For instance, the base compound could be another suitable compound that can liquefy and which can be spun in an electrostatic field, or in some cases even a solvent based system in which the solvent either evaporates or is separated during the dielectric spinning process.

In some cases, suitable base compounds could include molten glasses, molten metals, molten salts, minerals, ceramics, and pure liquid substances. Other base compounds could include mixtures, including polymer mixtures, as well as suspensions, emulsions, and solutions.

In general, according to the teachings herein, particles (e.g., fibers), and especially sub-micron particles and fibers may be formed by adding a dielectric additive to a base compound (e.g., adding glycerol to polypropylene), in some instances in combination with a dispersant. The base compound can then be liquefied, if not already a liquid when the dielectric additives are added. For instance, when the base compound is a polymer the polymer could be melted.

In some embodiments, the liquefied base compound can then be subjected to a strong force attenuation (e.g., mechanical attenuation) to form pre-particles, which in some cases may be micronic. The resulting pre-particles may then be spun in an electrostatic field (e.g., dielectrically spun) for example using the apparatus 10 as generally described above or another suitable apparatus.

More particularly, the liquefied base compound can be exposed to an electrostatic field when in a pre-particle state so that the electrostatic field can further attenuate the particles and fibrils to form very small particles (particularly nanoparticles or sub-micronic particles).

In general, a liquefied base compound may be mechanically attenuated to form the larger pre-particles (e.g., particles larger than one micron), which are further attenuated electrically by the electrostatic field (e.g., by dielectric spinning) to obtain the desired final particle size (e.g., particles less than one micron).

In some embodiments, mechanical attenuation may be done using one or more rotating surfaces (e.g. the rotating disc 12 described above), rotating capillaries (as described, for example, in PCT Application No. PCT/CA2009/000324 to Koslow), attenuation machines by DuPont, and so on. Mechanical attenuation could also be achieved by melt blowing, gravity, driving a spin-bonding using hypersonic air, fibrillating, and using various other techniques.

In general, the purpose of the mechanical or strong force attenuation is to overcome surface tension and other forces that, on a macroscopic scale, can inhibit particle attenuation within an electrostatic field. Thus, the liquid mixture can be reduced to pre-particles having a size sufficiently small such that dielectric spinning can become the dominant attenuation mechanism.

At some particle size, the strong forces required to perform further attenuation can become too high. At this point, dielectrophoretic forces tend to become dominant and can be used for further attenuation.

In particular, once the pre-particles are sufficiently small due to mechanical or other strong force attenuation (e.g., less than 20 microns, or even less than 12 microns or 5 microns), dielectrophoretic forces become dominant and the pre-particles can be successfully further attenuated by dielectric spinning (e.g., spinning in an electrostatic field) to achieve the desired sizes.

Dielectric spinning is usually preceded by "strong force" attenuation (e.g., mechanical attenuation) so that dielectrophoretic forces do not need to do all the attenuation. More particularly, "strong force" attenuation may be more efficient at producing pre-particles of certain sizes (e.g., micronic pre-particles) prior to dielectric spinning.

In general, in some embodiments pre-particles can be formed using any suitable melt blown techniques, which could include using a rotating disc or one or more various other techniques.

In some embodiments, dielectric spinning could be done without a "strong force" (e.g., mechanical) attenuation. For example, dielectric spinning according to the teachings herein could pull fibers or particles directly from a pool of liquid, although this is generally believed to be much more difficult.

In some embodiments, dielectric additives may be added to the base compound before the base compound is liquefied (e.g., by dry mixing). In other embodiments, the dielectric additives may be added to a molten, fluid or liquefied base compound.

For example, when the base compound is a polymer, dielectric additives could be dry mixed with polymer pellets before the polymer is melted, or mixed into a polymer melt.

In some embodiments, additional compounds may be added as the particles are collected (e.g., as the mat T) to provide a desired distribution of particles therein. For example, additional materials may be deposited onto the collection plate 20 as the mat T is formed. These materials could include various types of performance enhancing materials, such as for example carbon, activated carbon, super absorbent polymers, zeolites, clays such as bentonite or kaolin, diatomaceous earth, chopped fibers, ion exchange resins, Teflon powder, adsorbents, absorbents, silicates, aluminas, minerals, ceramics, glass, polymer powders, beads, granules, and more generally powders of all kinds.

At least some of the teachings herein may provide one or more benefits over other electric spinning techniques, including in particular melt electrospinning.

For example, the dielectric additives described herein tend to be relatively inexpensive as compared to other additives (e.g., conductive additives) used in melt electrospinning. In particular, dielectric additives may be 10 to 100 times less expensive (or more) and are generally used in smaller amounts as compared to the conductive additives used in melt electrospinning.

Moreover, although dielectric additives are generally not good conductors, this may not be a limiting factor to achieve good attenuation in dielectric spinning. More particularly, attenuation of particles using Coulomb forces may actually be much less desirable than dielectrophoretic attenuation that dominates in dielectric spinning.

The dielectric additives as described also tend to be thermally stable, particularly over the temperature ranges associated with polymer melts, and may less toxic than other additives. In some embodiments, the dielectric additives could include food grade non-toxic dielectric additives.

The dielectric additives as described herein also tend to be highly effective at low concentrations. For example, polyglycerol-3 was shown to be very effective at encouraging the formation of small polypropylene fibers at only 4 wt %. Such small concentrations can further reduce the costs associated with using dielectric additives, and moreover can ensure that the generated particles generally retain their desired mechanical properties without degradation.

The dielectric additives often impart a very low electrical conductivity to the mixture. Nevertheless, they can work well in electrostatic fields with very low amperage, which in some cases may be 1-2 orders of magnitude less than conventional electrospinning for a given output of product.

This can result in a safer process that requires less energy, uses smaller equipment and is generally less expensive to operate.

In some embodiments, the teachings herein may also allow for much faster production of particles, in some cases up to hundreds of times more quickly as compared to conventional electrospinning.

In some embodiments, the mixing of the various compounds may be achieved according to various techniques. For instance, in some cases a dispersant (e.g., sodium stearate) is added to a liquid dielectric additive (e.g., polyglycerol-3) and mixed distributively and dispersively (e.g., by aggressive high-shear mixing with a mixing element at several thousand rpm for several minutes).

In some embodiments, a dispersant (e.g., sodium stearate) is added to a liquid dielectric (e.g., polyglycerol-3) and mixed distributively and dispersively at an elevated temperature (e.g., 70 degrees Celsius).

In some embodiments, a dispersant (e.g., sodium stearate) is added to a liquid dielectric (e.g., polyglycerol-3) and mixed distributively and dispersively. The mixed dispersant and liquid dielectric are then added to a polymer (e.g., polypropylene) along with a viscosity reduction additive (e.g., Irgatec CR-76) and then mixed prior to melting. Once melted, the resulting compound can then be mixed distributively and dispersively.

In general, it may be desirable to ensure that a dispersant and liquid dielectric are rigorously mixed prior to being combined with the other ingredients (such as the based compound or polymer and a viscosity-reduction additive such as Irgatec CR-76). This can help ensure that the dielectric additive will disperse well within the mixture and ensure that the resulting fiber quality is good.

More particularly in some embodiments the dispersant and liquid dielectric can be mixed at elevated temperatures in order to: (i) lower the viscosity and (ii) improve the effectiveness of the surfactant/dispersant.

While the above description provides examples of one or more apparatus, systems and methods, it will be appreciated that other apparatus, systems and methods may be within the scope of the present description as interpreted by one of skill in the art.

The invention claimed is:

1. A method of forming particles, comprising:
   a. performing a strong force attenuation of a mixture to form pre-particles, the mixture including a base compound and a dielectric additive having an elevated dielectric constant dispersed therein, wherein the elevated dielectric constant is above 5; then
   b. subsequent to step a., dielectrically spinning the pre-particles in an electrostatic field to further attenuate the pre-particles and form the particles.

2. The method of claim 1, wherein the strong force attenuation includes mechanically attenuating the mixture.

3. The method of claim 1, wherein the base compound is a polymer.

4. The method of claim 3, further comprising melting the polymer to form a liquid polymer melt, then dielectrically spinning the liquid polymer melt to form polymer particles.

5. The method of claim 1, wherein the mixture includes a dispersant selected to encourage the dielectric additive to disperse within the base compound.

6. The method of claim 1, wherein the pre-particles are micronic.

7. The method of claim 1, wherein the particles are sub-micronic.

8. The method of claim 1, wherein the pre-particles are formed using any suitable melt blown technique.

9. The method of claim 1, wherein the pre-particles are formed using a rotating disc.

10. The method of claim 1, wherein the dielectric additive includes a ceramic dielectric.

11. The method of claim 1, wherein the dielectric additive includes high-relative permittivity nanoparticles dispersed within the base compound.

12. The method of claim 1, wherein the mixture includes a viscosity-reduction additive selected to reduce the viscosity of the base compound.

13. The method of claim 1, wherein the mixture includes a conductivity additive.

14. The method of claim 1, wherein the mixture includes an ionic liquid.

15. The method of claim 14, wherein the ionic liquid is mixed with the dielectric additive.

16. The method of claim 13, wherein the conductive additive is mixed with the dielectric additive.

17. The method of claim 1, wherein the mixture is substantially solvent-free.

18. The method of claim 1, wherein the dielectric additive includes polyglycerol-3.

* * * * *